United States Patent
Sawada

(10) Patent No.: US 7,706,608 B2
(45) Date of Patent: Apr. 27, 2010

(54) IMAGE PROCESSING DEVICE, IMAGE PROCESSING METHOD AND IMAGE PROCESSING PROGRAM

(75) Inventor: Yasuhiro Sawada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1357 days.

(21) Appl. No.: 11/149,008

(22) Filed: Jun. 9, 2005

(65) Prior Publication Data

US 2005/0276475 A1    Dec. 15, 2005

(30) Foreign Application Priority Data

Jun. 14, 2004    (JP)    ............................. 2004-175879

(51) Int. Cl.
G06K 9/00    (2006.01)
(52) U.S. Cl. ..................................... 382/167
(58) Field of Classification Search ................ 382/162, 382/167, 254; 348/645, 649, 650; 358/518, 358/519, 520
See application file for complete search history.

(56) References Cited

U.S. PATENT DOCUMENTS

| 3,971,065 | A | | 7/1976 | Bayer |
| 4,663,655 | A | | 5/1987 | Freeman |
| 5,148,502 | A | * | 9/1992 | Tsujiuchi et al. ............ 382/255 |
| 6,388,706 | B1 | | 5/2002 | Takizawa et al. |
| 2003/0160875 | A1 | | 8/2003 | Mitsunaga |

FOREIGN PATENT DOCUMENTS

| EP | 1487219 A1 | 12/2004 |
| JP | 9-168157 A | 6/1997 |
| JP | 10-178650 A | 6/1998 |
| JP | 2002-209223 A | 7/2002 |
| JP | 2003-179941 A | 6/2003 |
| JP | 2003-224859 A | 8/2003 |
| JP | 2003-284084 A | 10/2003 |
| JP | 2004-056640 A | 2/2004 |
| JP | 2004-153753 A | 5/2004 |

OTHER PUBLICATIONS

Takashi Komatsu et, al., "A Note on Demosaicing Methods Taking into Account the Properties of . . . ", 2003 Annual Conference, Institute of Image Formation & TV Engineers.

(Continued)

Primary Examiner—Jose L Couso
(74) Attorney, Agent, or Firm—Canon U.S.A. Inc., I.P. Division

(57) ABSTRACT

An image processing device generates an output image as a color image wherein each pixel has color information, using a first image as a sparsely color sampled image wherein each pixel has monochromatic information obtained by an image sensor which has multiple pixels each photoelectrically converting light of a plurality of colors. The device includes: a simulation unit for generating a second image as an estimated image of the sparsely color sampled image; a comparison unit for comparing the second image with the first image, and generating first information thereof; a converting unit for converting the first information into second information corresponding to the color image; a penalty computing unit for computing the correction amount of the input image; and a correction unit for generating a third image by correcting the input image based on the second information and the correcting amount; this third image being used as an output image.

20 Claims, 16 Drawing Sheets

OTHER PUBLICATIONS

ISO/IEC JTC1 10918-1: ITU-T Rec. T. 81 "Information technology—Digital compression and coding of continuous-tone still images: Requirements and guidelines" 1992.

Chang, Ed. et al., "Color Filter Array Recovery Using a Threshold-based Variable Number of Gradients" Proceedings of SPIE, Jan. 1999.

* cited by examiner

FIG. 5

| 0 | 1 | 0 | 1 |
|---|---|---|---|
| 1 | 0 | 1 | 0 |
| 0 | 1 | 0 | 1 |
| 1 | 0 | 1 | 0 |

FIG. 6

| 0 | 1 | 0 | 1 |
|---|---|---|---|
| 0.4 | 0 | 0.4 | 0 |
| 0 | 1 | 0 | 1 |
| 0.4 | 0 | 0.4 | 0 |

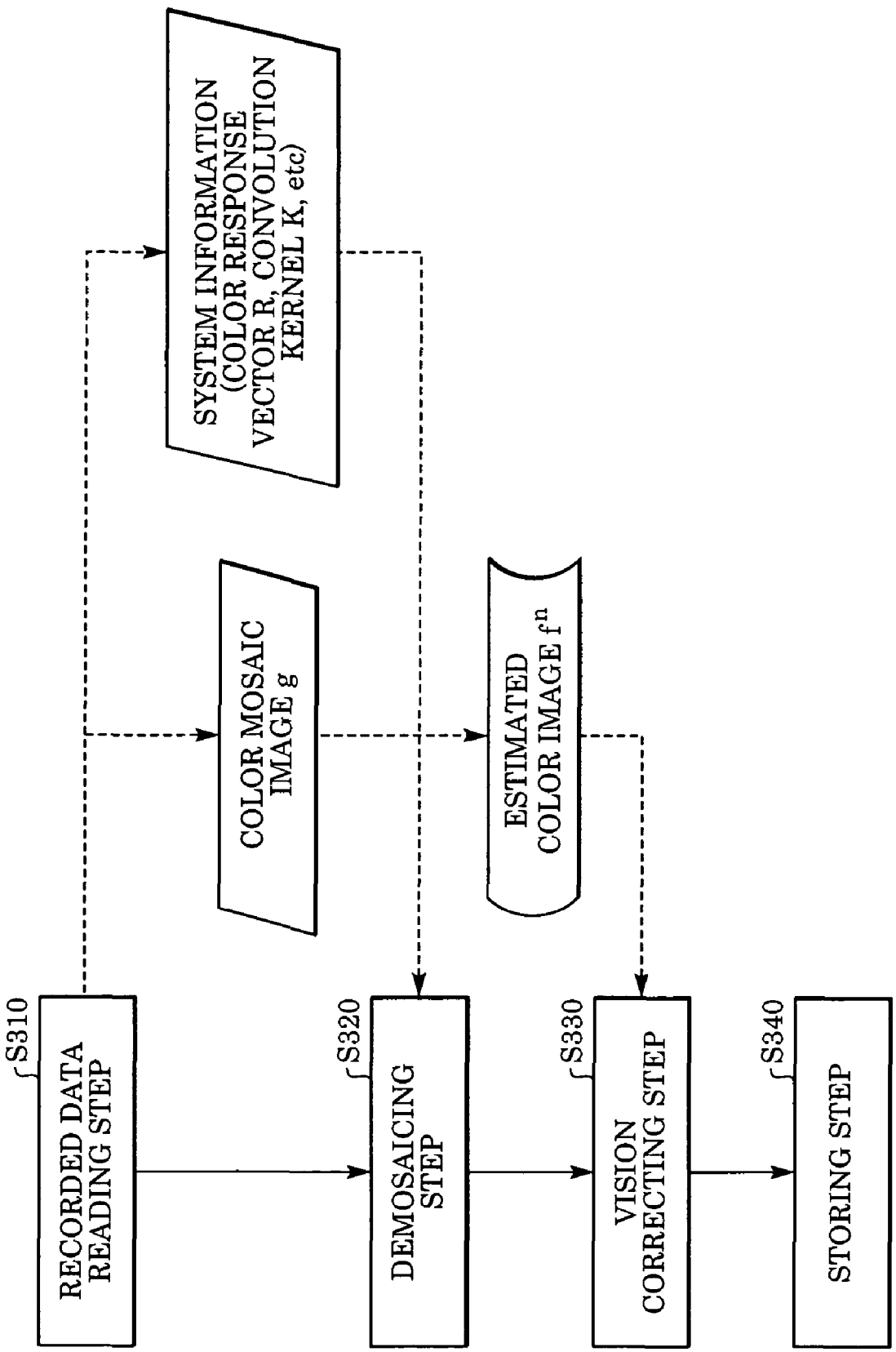

IMAGE PROCESSING DEVICE, IMAGE PROCESSING METHOD AND IMAGE PROCESSING PROGRAM

BACKGROUND OF THE INVENTION

1. Field of the Invention

The present invention relates to an image processing device, method, and program, for generating a color image from a sparsely color sampled image which is acquired by using a single-chip color image sensor, and further relates to an image processing device, method, and program, for performing a demosaicing process including processing such as noise reduction, optical low-pass filter compensation and pixel drop-out processing.

2. Description of the Related Art

Hitherto, single-CCD (charge-coupled device) color image sensors have been widely used in color imaging devices such as digital cameras and compact video cameras. A single-CCD color image sensor includes, on the front face of a solid-state image sensor, a color filter array in which color transmission properties that differ for each pixel are provided in a specified array or a random array. For example, a color filter array such as illustrated in FIG. 4 uses an RGB (Red-Green-Blue) color Bayer pattern in which the color filters with color transmission characteristics corresponding to R, G, B are cyclically ordered every 2×2 pixels at a ratio of R:G:B=1:2:1 (see U.S. Pat. No. 3,971,065).

The output image of such a single-CCD color image sensor (RAW image) is a so-called color mosaic image in which each pixel only has information about a single color, and therefore as a color imaging device, a demosaicing process which converts the RGB color information (color information) as to the various pixels of this color mosaic image into a color image becomes necessary.

With the demosaicing process, a method which spatially interpolates the color information lacking in various pixels from the surrounding pixels is widely used.

However, with the aforementioned RGB color Bayer pattern, for example, simply interpolating results in the resolution essentially decreasing, because G has only one half of all the pixels and R and B each have only one fourth of all the pixels.

In order to solve this problem, an interpolation method using applicable directional selective smoothing has been proposed, such as a two-directional correlation method (see U.S. Pat. No. 4,663,655) or an eight-direction edge detecting method (for example, see Chang, Ed. et al., "Color Filter Array Recovery Using a Threshold-based Variable Number of Gradients" Proceedings of SPIE, January, 1999).

On the other hand, a recent trend has been to emphasize not only pixel count, but also color reproducibility and dynamic ranging as capabilities of a digital camera. Thus, a color filter array having color filters of four or more colors may be used (see Japanese Patent Laid-Open No. 2003-284084), or a color filter array having color filters of six or more types of colors may be used by providing variation in magnitude of transmittance even when the chrominance is similar (for example, see U.S. Published patent application No. US 2003-160875AA). Further, in order to suppress color moiré, a technique has been proposed using a random color array in the color filter array or a cycle longer than 2×2 pixels (see Japanese Patent Laid-Open No. 9-168157).

Further, with iterative restoration in which a decompressed image which is similar to the source image is obtained by repeating interpolation calculations, a method in which inappropriate image restoration which restores up to a bandwidth past the Nyquist frequency can be avoided, by considering the birefringence of the optical low-pass filter which is placed between the photography optical system and the image sensor and by limiting the frequency band of the restored image, has been proposed (see "A Study of Demosaicing With Regard to Characteristics of a Birefringent Optical Low-Pass Filter" by Takashi Komatsu and Takahiro Saito, 2003 Annual Conference, Institute of Image Formation and Television Engineers).

However, the demosaicing processes proposed therein are based on spatial interpolation of same color pixels, and therefore when the number of colors in the color filter is increased, the pixel count for a specified color decreases and spatial resolution degrades and becomes a problem. Further, even with a random color filter array, similar problems can occur because regions wherein pixels of the same color become locally non-dense occur.

Further, the discrepancy of the color permeability characteristics, based on manufacturing error of the color filter array between the pixels of the same pixel color, is manifested as noise.

SUMMARY OF THE INVENTION

According to a first aspect of the present invention, an image processing device for generating an output image as a color image wherein each pixel has color information, using a first image as a sparsely color sampled image wherein each pixel has monochromatic information, which is obtained by an image sensor which has multiple pixels that photoelectrically convert light of a plurality of colors includes: a simulation unit configured to generate a second image as an estimated image of the sparsely color sampled image by simulating imaging using the image sensor based on the first image as the color image; a comparison unit configured to compare the second image and the first image, and generating first information which shows this comparison result; a converting unit configured to convert the first information into the second information which corresponds to the color image; a penalty computing unit configured to compute the correction amount of the input image based on the image penalty which is determined corresponding to the input image; and a correction unit configured to generate a third image as the color image, by correcting the input image based on the second information and the correcting amount. The third image which is generated by repeating the processing at the various units as the input image of the third image becomes the output image.

According to a second aspect of the present invention, an imaging device includes an image sensor and the image processing device of the first aspect.

According to a third aspect of the present invention, an image processing device for generating an output image as a color image wherein each pixel has color information, using a first image as a sparsely color sampled image wherein each pixel has monochromatic information, which is obtained by an image sensor which has multiple pixels that photoelectrically convert light of a plurality of colors includes: a simulation unit configured to generate a second image as an estimated image of the sparsely color sampled image by simulating imaging using the image sensor including nonlinear conversion based on the first image as the color image; a comparison unit configured to compare the second image with the first image, and generating first information which shows this comparison result; a converting unit configured to convert the first image into the second information which corresponds to the color image; a correction unit configured to generate a third image as the color image, by correcting the input image based on the second information. The third image which is generated by repeating the processing at the various units as the input image of the third image becomes the output image.

According to a fourth aspect of the present invention, an imaging device includes an image sensor and the image processing device of the third aspect.

According to a fifth aspect of the present invention, an image processing method for generating an output image as a color image wherein each pixel has color information, using a first image as a sparsely color sampled image wherein each pixel has monochromatic information, which is obtained by an image sensor which has multiple pixels that photoelectrically convert light of a plurality of colors includes: a simulation step for generating a second image as an estimated image of the sparsely color sampled image by simulating imaging using the image sensor based on the first image as the color image; a comparison step for comparing the second image with the first image, and generating first information which shows this comparison result; a converting step for converting the first information into the second information which corresponds to the color image; a penalty computing step for computing the correction amount of the input image based on the image penalty which is determined corresponding to the input image; and a correction step for generating a third image as the color image by correcting the input image based on the second information and the correcting amount. The third image, which is generated by repeating the processing in the various steps as the input image of the third image, becomes the output image.

According to a sixth aspect of the present invention, an image processing program causes a computer to execute the image processing method of the fifth aspect.

According to a seventh aspect of the present invention, an image processing method for generating an output image as a color image wherein each pixel has color information, using a first image as a sparsely color sampled image wherein each pixel has monochromatic information, which is obtained by an image sensor which has multiple pixels that photoelectrically convert light of a plurality of colors includes: a simulation step for generating a second image as an estimated image of the sparsely color sampled image by simulating imaging using the image sensor including nonlinear conversion based on the first image as the color image; a comparison step for comparing the second image with the first image, and generating first information which shows this comparison result; a converting step for converting the first information into the second information which corresponds to the color image; a correction step for generating a third image as the color image, by correcting the input image based on the second information. The third image which is generated by repeating the processing in the various steps as the input image of the third image, becomes the output image.

According to an eighth aspect of the present invention, an image processing program causes a computer to execute the image processing method of the seventh aspect.

Further features and advantages of the present invention will become apparent from the following description of exemplary embodiments with reference to the attached drawings.

BRIEF DESCRIPTION OF THE DRAWINGS

FIG. 5 is a diagram illustrating an example of a color mosaic image.

FIG. 6 is a diagram illustrating an example of another color mosaic image.

FIG. 20 is a flowchart illustrating the operation of an image processing device according to a seventh embodiment of the present invention.

DESCRIPTION OF THE EMBODIMENTS

Figure 1:
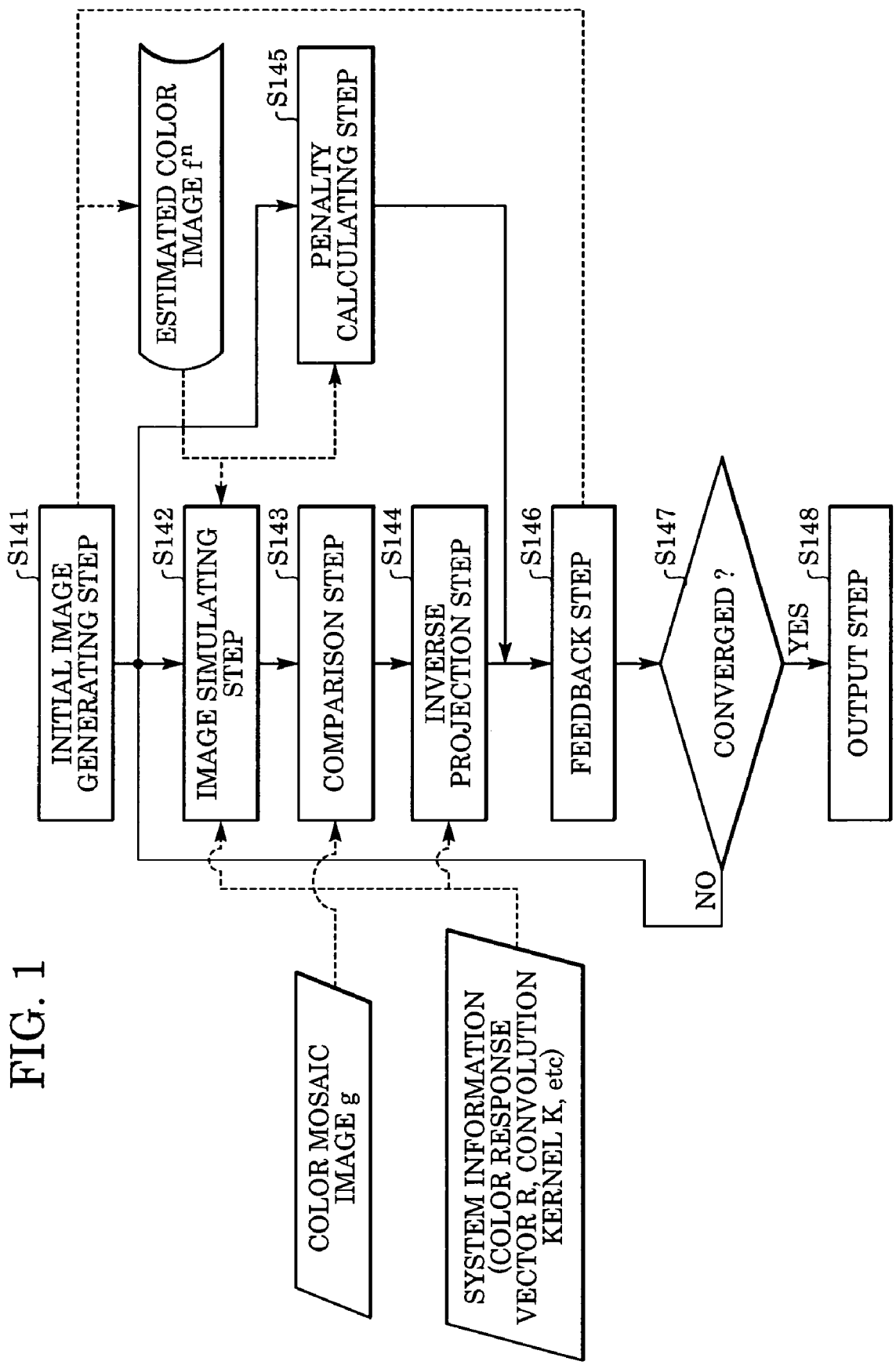
FIG. 1 is a flowchart illustrating the steps of the image processing method according to a first embodiment of the present invention.

With the present invention, an image processing device, method, and program which are capable of generating a high quality color image with high resolution and low noise or false color from a color separating image acquired from an image sensor are provided as exemplary forms, according to the following configurations.

With the image processing device of the embodiments, an image processing device generates an output image as a color image in which each pixel has color information, using a first image as a sparsely color sampled image wherein each pixel has monochromatic information, which is obtained by an image sensor which has multiple pixels that photoelectrically convert light of color that differs one from another. The image processing device includes a simulation unit, a comparison unit, a converting unit, a penalty computing unit, and a correction unit. The simulation unit is used for generating a second image as an estimated image of the sparsely color sampled image by simulating the imaging using the image sensor based on the input image as the color image. The comparison unit is used for comparing the second image and the first image and generating first information which shows this comparison result. The converting unit is used for converting the first information into the second information which corresponds to the color image. The penalty computing unit is used for computing the correction amount of the input image based on the image penalty which is determined corresponding to the input image. The correction unit is used for generating a third image as the color image by correcting the input image based on at least one of the second information and the correcting amount. The input image may be amended based on both the second information and the correcting amount with the image processing device. The third image which is generated by repeating the processing of the various units as the input image becomes the output image.

Here, the aforementioned simulation unit generates the second image as the estimated image of the aforementioned sparsely color sampled image, by simulating the imaging wherein the aforementioned image sensor is used, including non-linear conversion, based on the input image of the aforementioned color image.

Also, the aforementioned first image may be acquired through a color filter, with the aforementioned simulation unit performing a color response conversion wherein the characteristics of the aforementioned color filter are simulated, and the aforementioned converting unit performing color distribution corresponding to the aforementioned color response conversion.

Further, the aforementioned first image may be acquired through an optical low-pass filter, with the aforementioned simulation unit performing convolution wherein the characteristics of the aforementioned optical low-pass filter are simulated, and the aforementioned converting unit performing inversion convolution as to the results of the aforementioned convolution.

Also, the above-described comparison unit may generate the aforementioned first information illustrating the difference between the aforementioned third image and the aforementioned first image. Also, the comparison unit may generate the aforementioned first information illustrating the ratio between the aforementioned third image and the aforementioned first image.

Further, the aforementioned simulation unit performs linear conversion, and nonlinear conversion which acts upon elements within the same basis space and does not reverse the magnitude correlation of the aforementioned elements. Also, the aforementioned correcting amount is a value which decreases the aforementioned image penalty by adding to the aforementioned input image.

Here, the aforementioned image penalty is expressed as the sum of pixel penalty capable of calculating by pixel. Also, the aforementioned image penalty is expressed using a color plane penalty capable of calculating by color plane. Here, the aforementioned color plane penalty reflects the correlation between the aforementioned color plane and other color planes. Also, the aforementioned color plane penalty inversely correlates to the product of the amount of change in this color plane and the amount of change in other color planes. Further, the aforementioned color plane has a luminance plane and multiple chrominance planes, and calculations are performed with the aforementioned luminance plane and the aforementioned chrominance plane, which differs from the aforementioned color plane penalty. Here, the aforementioned chrominance plane penalty directly correlates to the amount of change of the chrominance plane, and includes the term proportional to the sum of pixels of the value which inversely correlates to the amount of change of the luminance plane.

The image penalty includes an item in direct correlation with the difference as to the smoothed image of at least one color plane. Also, the image penalty is in direct correlation with the amount of the high-frequency component of the third image. Also, the image penalty is a value in direct correlation with the size of the image data generated by compressing the third image.

Further, the image processing device according to another aspect of the present invention is an image processing device for generating an output image as a color image wherein each pixel has color information, using a first image as a sparsely color sampled image wherein each pixel has monochromatic information, which is obtained by an image sensor which has multiple pixels that photoelectrically convert light of color that differs one from another. The image processing device includes a simulation unit, a comparison unit, a converting unit, and a correction unit. The simulation unit is used for generating a second image as an estimated image of the aforementioned sparsely color sampled image by simulating the imaging using the aforementioned image sensor including nonlinear conversion, based on the input image as the aforementioned color image. The comparison unit is used for comparing the aforementioned second image and the aforementioned first image and generating first information which shows this comparison result. The converting unit is used for converting the second information which corresponds to the aforementioned first information to the aforementioned color image. The correction unit is used for generating a third image as the aforementioned color image by correcting the aforementioned input image based on the aforementioned second information. With the aforementioned image processing device, the aforementioned third image which is generated by repeating the processing of the aforementioned various units as the aforementioned input image of the aforementioned third image, becomes the aforementioned output image.

Here, the aforementioned nonlinear conversion is a nonlinear conversion which acts upon each element within the same basis space and does not reverse the magnitude correlation of the aforementioned elements.

The imaging device according to the present invention may include an image sensor and the above-described image processing device.

Now, with this imaging device, the aforementioned image sensor is one of an image sensor in which color filters of four or more colors are arranged, an image sensor in which color filters of multiple colors are arranged in a cycle greater than 2×2, or an image sensor in which the color filters of multiple colors are in an irregular arrangement.

Further, the image processing method of the present invention is an image processing method for generating an output image as a color image in which each pixel has color information. A first image is used as a sparsely color sampled image in which each pixel has monochromatic information. The first image is obtained by an image sensor which has multiple pixels that photoelectrically convert light of color that differs one from another. The image processing method includes a simulation step for generating a second image as an estimated image of the sparsely color sampled image, by simulating the imaging using the image sensor based on the input image as the color image; a comparison step for comparing the second image and the first image, and generating first information which shows this comparison result; a converting step for converting the first information into the second information which corresponds to the color image; a penalty computing step for computing the correction amount of the input image based on the image penalty which is determined corresponding to the input image; and a correction step for generating a third image as the color image, by correcting the input image based on at least one of the second information and the correcting amount. The input image may be amended based on both the second information and the correcting amount. The third image which is generated by repeating the processing of the correction step as the input image of the third image becomes the output image.

Further, the image processing method of another aspect of the present invention is an image processing method for generating an output image as a color image wherein each pixel has color information, using a first image as a sparsely color sampled image wherein each pixel has monochromatic information, which is obtained by an image sensor which has multiple pixels that photoelectrically convert light of color that differs one from another. The method includes: a simulation step for generating a second image as an estimated image of the sparsely color sampled image, by simulating the imaging using the image sensor including nonlinear conversion, based on the input image as the color image; a comparison step for comparing the second image and the first image, and generating first information which shows this comparison result; a converting step for converting the first information into the second information which corresponds to the color image; a correction step for generating a third image as the color image, by correcting the input image based on the second information. With the image processing device, the third image which is generated by repeating the processing of the correction step as the input image of the third image becomes the output image.

An image processing program according to the present invention is a program for the purpose of the computer executing the above-described image processing method.

According to the present invention, a high quality color image which has high resolution and low false color can be generated from a color separating image acquired from a single-CCD color image sensor.

Here, the demosaicing process of the present invention does not limit the array or number of colors of the color filter. Therefore, a non-cyclic color filter array or a color filter not bound by RGB colors or complementary colors can be provided on the image sensor, and degradation of the resolution is reduced, and high color reproducibility or dynamic range can be realized.

Further, the demosaicing process of the present invention can include noise reduction, optical low-pass filter compensation, and pixel drop-out processing. In this case, the necessity for performing these processes separately can be alleviated.

An overview of the image processing method according to an embodiment of the present invention will be described below. For the present embodiment, the image processing method for generating a color image in which the various pixels have color information will be described, using an observed color mosaic image (a first image as a color separating image) acquired from the image sensor including a color filter array which has color permeability characteristics that are not uniform across all pixels (in other words, an image sensor in which the color filter with R, G, B and the like are arranged in a regular or irregular arrangement, and that has multiple pixels which perform photoelectric transfer with the various differing color light).

This image processing method is based on the input color image (input image) and simulates the imaging which uses the above-mentioned image sensor. The method includes: an image simulating step for generating an estimated color mosaic image (a second image) from an image supposed to have been acquired from this image sensor; a comparison step for comparing the estimated color mosaic image obtained from the image simulating step and the observed color mosaic image obtained from the estimated color mosaic image and the image sensor; and an inverse projection step for rendering (converting) this comparison result (first information) onto the color image space.

Also, this method may include an image penalty calculating step for calculating the correction amount of the input color image based on the image penalty (here a penalty function for defining the unnaturalness of this color image) to be defined as to the color image input in the image simulation step, and a feedback step for correcting the color image input in the image simulating step based on above-mentioned expanded comparison result and the correction amount.

The color image corrected in the feedback step (third image) is input into the image simulating step and the image penalty calculating step. Further, after the simulating step, the comparison step, the inverse projection step, the image penalty calculating step, and the feedback step are performed repeatedly multiple times, the color image corrected in the feedback step is taken as the output image.

Here, the color original image of the field (object) shall be $f=\{f^R, f^G, f^B\}=\{f^R_{x,y}, f^G_{x,y}, f^B_{x,y}\}$, and the color mosaic image that is the color separating image actually acquired from the image sensor including the color filter array in which the various RGB color filters are arranged in a mosaic shall be $g=\{g_{x,y}\}$. Further, quantization and noise shall be considered negligible, and the ideal observed color mosaic image $g'=\{g'_{x,y}\}$ shall be $g' \equiv Af$. A is a system matrix, wherein the system until the color original image becomes the color mosaic image (conversion by imaging optical system or optical low pass filter, color filter array and the like) is expressed in a matrix.

When writing an expression with such a determinant, f and g are reread as one-dimensional vectors $\{f_j\}$, $\{g_i\}$. When the pixel count x×y is M, i=1, 2, and so on through M, and j=1, 2, and so on through 3M, resulting in a matrix wherein A has M rows and 3M columns. Generally, the pixel count M ranges from several hundred thousand to several million.

With the estimated color image, which is the color image estimated to be photographed, as $f^k$, the estimated color mosaic image $g'^k = Af^k$ is calculated in the image simulating step, $d^k = g - g'^k$ is calculated in the comparison step, $e^k = A^t d^k$ is calculated in the projection step, and $f^{n+1} = f^n + \mu e^n$ is calculated in the feedback step.

Thus, $$f^{n+1} = f^n + \mu A^t(g - Af^n) \tag{1}$$

is calculated. By operating these steps repeatedly multiple times, $f^k$ can achieve the converged solution $g = Af^k$.

In expression (1), multiplication by A or $A^t$ is a matrix and does not require calculation. Specifically, in the simulation step, performing the color response conversion which simulates the color filter characteristics or the convolution processing that simulates the optical low-pass filter characteristics is sufficient. Also, in the inverse projection step, performing color distribution corresponding to color response conversion which simulates the color filter characteristics, or inverse convolution processing of convolution which simulates the optical low-pass filter is sufficient.

The processing in the inverse projection step does not need to be accurately $A^t$, rather, matching of inclination is sufficient since they are actually in successive approximation. Thus, the processing in the inverse projection step does not need to precisely correspond to the simulating step, and can be simplified.

Further, the system until the color original image becomes the color mosaic image can have a nonlinear conversion P. This nonlinear conversion P acts upon each element within the same basis space, and does not reverse the magnitude correlation of the elements. A nonlinear conversion that corresponds to the output saturation of a solid-state image sensor or that corresponds to a characteristic curve can be considered, and in particular with that which corresponds to the output saturation, the nonlinear conversion P can be said to be one type of convex set.

At this time the ideal color mosaic image can replace g'=Af with g'=P(Af), but is ignored in the inverse projection, and $$f^{k+1} = f^k + \mu A^t \{g - P(Af^k)\} \quad (2)$$

can be calculated. There may be a case in which a linear conversion further follows the nonlinear conversion, and if $$g' = P_1(A_1 P_2(A_2 \ldots P_n(A_n f) \ldots )), \text{ then} \quad (3)$$

$$f^{k+1} = f^k + \mu(A_1 \, A_2 \ldots A_n)^t [g - P_1\{A_1 \, P_2(A_2 \ldots P_n(A_n f^k) \ldots)\}]$$

holds.

The above expression is applicable to the case in which g' follows a Gaussian distribution of the expected value g, but in the case in which the observed value g follows a Poisson distribution of the expected value g', the estimated image $g'^k = Af^k$ is calculated in the image simulation step, $d^k = g/g'^k$ is calculated in the comparison step, $e^k = A^t d^k$ is calculated in the projection step and $f^{k+1} = (1/A^t 1 \times e^k) \mu \times f^k$ in the feedback step. Also, the fraction symbols mean the division of vectors by element, "×" means multiplication of vectors by element, and 1 means one vector of the entire element count M. Thus, $$f^{k+1} = (1'/A^t 1 \times A^t(g/Af^k)) \mu \times f^k \quad (4)$$

is calculated, and similarly $f^k$ arrives at the converged solution $g = Af^k$. Now, 1' indicates one vector of the entire element count 3M.

Figure 18:
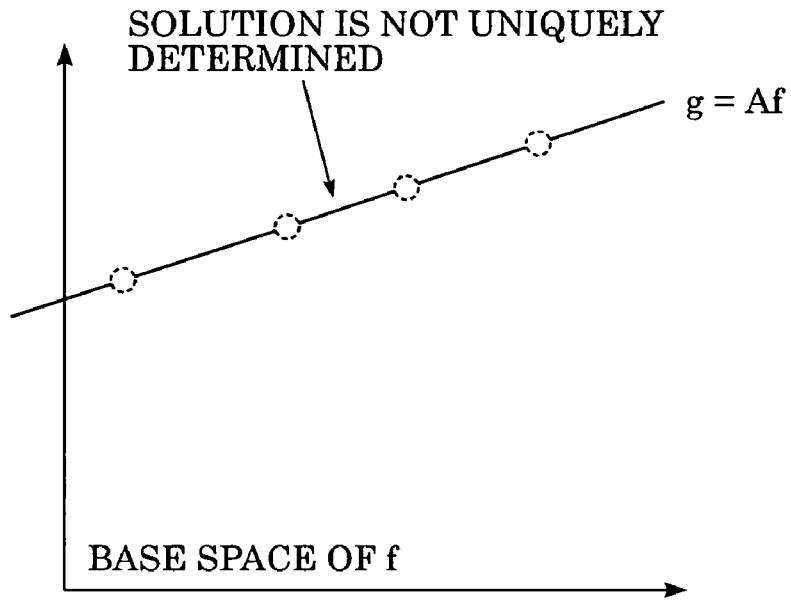
FIG. 18 is a model diagram illustrating the conversion from a color mosaic image to a color image.

However, in actuality these successive expressions are not stable. As illustrated in FIG. 18, this is because g'=Af which is a conversion by the system matrix A is degraded and converted from the vector f of an element count 3M to the vector g' of an element count M, and has 2M degrees of freedom even if the solution f which yields a given vector g' is less. For example, if the system includes a low-pass filter, because the degrees of freedom is in a high frequency range, the estimated color image $f^k$ after repeated iterations will include high frequency noise.

Thus, further expressing the "unnaturalness" of the estimated color image $f^k$ is with the penalty function (image penalty) U ($f^k$), then $\delta f^k = \nabla_f U(f^k)$ as the minute correction amount based on the image penalty is calculated in the image penalty calculation step, and $f^{k+1} = f^k + \mu(e^k - \beta \delta f^k)$ is calculated in the feedback step. Now, $\nabla f$ is the gradient in each element of $f^k$, and shall be $\nabla f = \{\partial/\partial f_j^k\}$.

Figure 19:
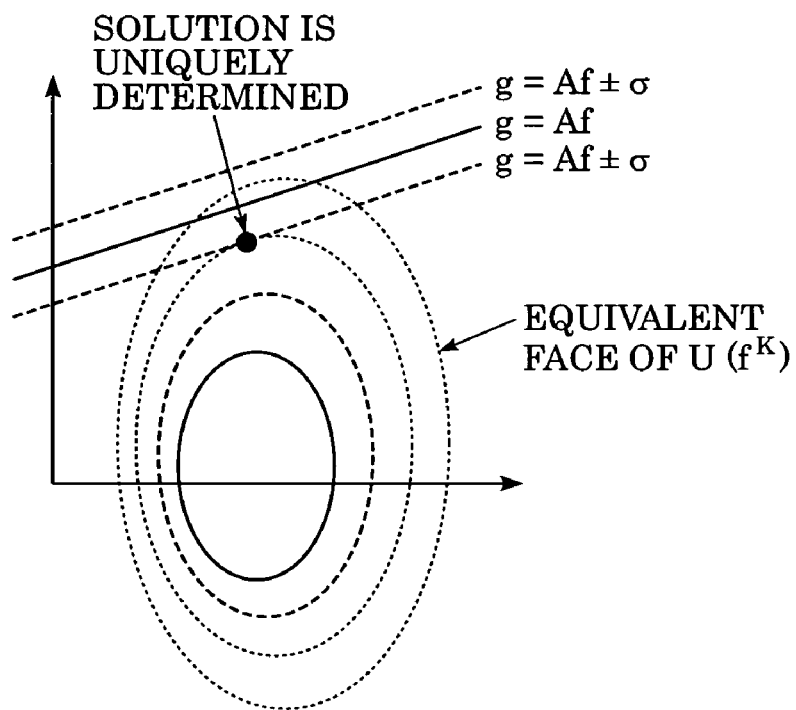
FIG. 19 is a plan view illustrating the conversion from a color mosaic image to a color image using a penalty function.

Thus, the successive expression $$f^{k+1} = f^k + \mu(A^t(g - Af^k) - \beta \nabla_f U(f^k)) \quad (5)$$

is calculated, and similarly $f^k$ arrives at $$A^t(g - Af^k) = \beta \nabla_f U(f^k) \quad (6)$$

as a converged solution. In this expression, if β=0, then $g = Af^k$, however if β is a positive minute value, then the error of measurement $\epsilon = g - Af^k$ is set as a sufficiently small value, and prevents the penalty function U ($f^k$) from becoming too great. The error of measurement $\epsilon$ might be $\epsilon^2$ through $M\sigma^2$ from the $\chi^2$ distribution, with the standard deviation as σ. Therefore, by selecting such a converged solution B, within the solution $g = Af + \epsilon$ that yields a reasonable error of measurement $\epsilon$, the smallest penalty function U ($f^k$) is given, that is to say, the solution $f^k$ for the most "natural" image can be obtained (see FIG. 19). This penalty function U ($f^k$) corresponds to prior probability in the Bayer's' theorem.

Also, in the case in which the measurement value g follows a Poisson distribution of the expected value g', the successive expression becomes $$f^{k+1} = \left(\frac{1'}{A^t 1 \times (1' + \sigma^2 \nabla_f U(f^k))} \times A^t \frac{g}{Af^k}\right)^\mu \times f^k \quad (7)$$

These expressions are also of successive approximation, and so similar to the processing of inverse projection not needing to be accurately $A^t$ but matching of inclination being sufficient, $\nabla_f U$ ($f^k$) also does not need to be the accurate gradient U ($f^k$), and having the vector $\delta f^k$ in the color image space is sufficient where U ($f^k + \delta f^k$) > U ($f^k$).

Next, the penalty function U ($f^k$) is considered. As a general nature of an image, for example the correlation between adjacent pixels is high in a grayscale natural image, the greater the difference $|\nabla_{x,y} f|$ between the adjacent pixels the more unnatural the image, and when the penalty function is $$U(f^x) = k_x \Sigma_{x,y} (\nabla_{x,y} f^x)^2 \quad (8)$$

then $$\nabla_{fX} U(f^x) = k_X \Delta_{x,y} f^x \quad (9)$$

holds.

Here, $k_x$ is a constant of proportion, and $\Delta_{x,y} f^x$ can also have the kernel expressed as a convolution $H * f^x$ as $$H = \begin{pmatrix} 0 & -1 & 0 \\ -1 & 4 & -1 \\ 0 & -1 & 0 \end{pmatrix} \Big/ 4$$

on the pixel face. Further, if $$S = \begin{pmatrix} 0 & 1 & 0 \\ 1 & 4 & 1 \\ 0 & 1 & 0 \end{pmatrix} \Big/ 8 \text{ then} \quad (10)$$

$$\nabla_{fX} U(f^X) = H * f^X = 2k_X(f^X - S * f^X)$$

Since the convolution S* from S performs smoothing of the image, if this smoothing is generalized, we can consider $$\delta f^x = k_x(f^x - \text{smooth}(f^x)) \quad (11)$$

For smooth (f*), a convolution by a kernel that has a larger radius such as $$\begin{pmatrix} 1 & 2 & 1 \\ 2 & 4 & 2 \\ 1 & 2 & 1 \end{pmatrix} \Big/ 16 \text{ or } \begin{pmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{pmatrix} \Big/ 256$$

or various image smoothing or noise reduction filters such as a median filter or bilateral filter that has excellent edge preserving characteristics, or a combination thereof, can be used without being limited to the above-described convolution S*.

If this is simply expanded to the color image f, then $$\delta f = \{2k_R(f^R - \text{smooth}(f^R)), 2k_G(f^G - \text{smooth}(f^G)), 2k_B(f^B - \text{smooth}(f^B))\} \quad (12)$$

holds.

However, this is a calculation independent for each color plane, and cannot suppress the false color (color offset) within the image edge portion. In order to suppress false color, the correlation between the color planes must be considered. Thus, as the result of examining the color natural image, it was discovered that, with the chrominance as color difference Cb and Cr, the chrominance difference between adjacent pixels had a high correlation, and in the image edge portion in which luminance changes, chrominance also has a high probability of changing. Thus, for example a penalty function such as the following may be conceived.

$$U(f^C) = 2 \sum_{x,y} \frac{(\nabla_{x,y} f^C)^2}{(\Delta_{x,y} f^Y)^2 + d} \quad (13)$$

Here, $f^C$ and d are the fudge factors that prevent the quotient from becoming infinitely large when $f^{Cb}$ or $f^{Cr}$ and $\Delta_{x,y} f^Y = 0$, respectively. Thus, the image penalty (penalty in a chrominance plane) is $$\delta f^C = \nabla_{f^C} U(f^C) = 2 \frac{\Delta_{x,y} f^C}{(\Delta_{x,y} f^Y)^2 + d} \quad (14)$$

Now, when using this, (Expression 11) should be applied to the luminance plane, and $$\delta f = \left\{ k_Y(f^Y - \text{smooth}(f^Y)), \right. \\ \left. k_{Cb} \frac{\Delta_{x,y} f^{Cb}}{(\Delta_{x,y} f^Y)^2 + d}, k_{Cr} \frac{\Delta_{x,y} f^{Cr}}{(\Delta_{x,y} f^Y)^2 + d} \right\} \quad (15)$$

should be applied to $f = (f^Y, f^{Cb}, f^{Cr})$ which is the luminance—color expression (YCbCr) of the color image.

Alternatively, the color plane correlation can be used directly, and if the higher correlation between the color planes is considered to be natural, the penalty function U(f) can be said to be inversely correlated to the color plane correlation, and can be $$U(f) = (k \times (\nabla_{x,y} f^R)^2 + (\nabla_{x,y} f^G)^2 + (\nabla_{x,y} f^B)^2) - kc(\nabla_{x,y} f^R \times \nabla_{x,y} f^G + \nabla_{x,y} f^G \times \nabla_{x,y} f^B + \nabla_{x,y} f^B \times \nabla_{x,y} f^R) \quad (16)$$

as to $f = \{f^R, f^G, f^B\}$ Now, "×" means multiplication of each element.

Thus, the image penalty can also be $$\delta f = \nabla_f U(f) \quad (17)$$
$$= \{2kx\Delta_{x,y} f^R - kc(\Delta_{x,y} f^G + \Delta_{x,y} f^B),$$
$$2kx\Delta_{x,y} f^G - kc(\Delta_{x,y} f^R + \Delta_{x,y} f^B),$$
$$2kx\Delta_{x,y} f^B - kc(\Delta_{x,y} f^R + \Delta_{x,y} f^G)\}$$

Also, if this penalty function is $$U(f^R) = \nabla_{x,y} f^R \times (kx\nabla_{x,y} f^R - kc\nabla_{x,y} f^G - kc\nabla_{x,y} f^B)$$
$$U(f^G) = \nabla_{x,y} f^G \times (kx\nabla_{x,y} f^G - kc\nabla_{x,y} f^R - kc\nabla_{x,y} f^B)$$
$$U(f^B) = \nabla_{x,y} f^B \times (kx\nabla_{x,y} f^B - kc\nabla_{x,y} f^R - kc\nabla_{x,y} f^G) \quad (18)$$

Where kx>2kc for each color plane, then the image penalty can be said to be the sum of these.

The various coefficients k listed up to this point have not been clear, and making a logical determination is difficult. Therefore, one method would be to adjust the error of measurement g−Af to be a reasonable value (g−Af)² through Mσ², as to the final converged solution f.

Further, another concept would be that the penalty function U(f^x) is negative entropy. A formulated calculation method of entropy as to an image has not been determined, but one indicator is known in which if the image compression method is appropriate, the generated data becomes the size according to negative entropy, and can be $$U(f) = [\text{data size generated by image compression of } f] \quad (19)$$

The above description expressed color with three bases, but this can easily be expanded to a basis expression of two, or four or more.

First Embodiment

The image processing device and a color imaging device (digital camera) 100 in which the image processing device is loaded according to the first embodiment of the present invention are described next.

Figure 2:
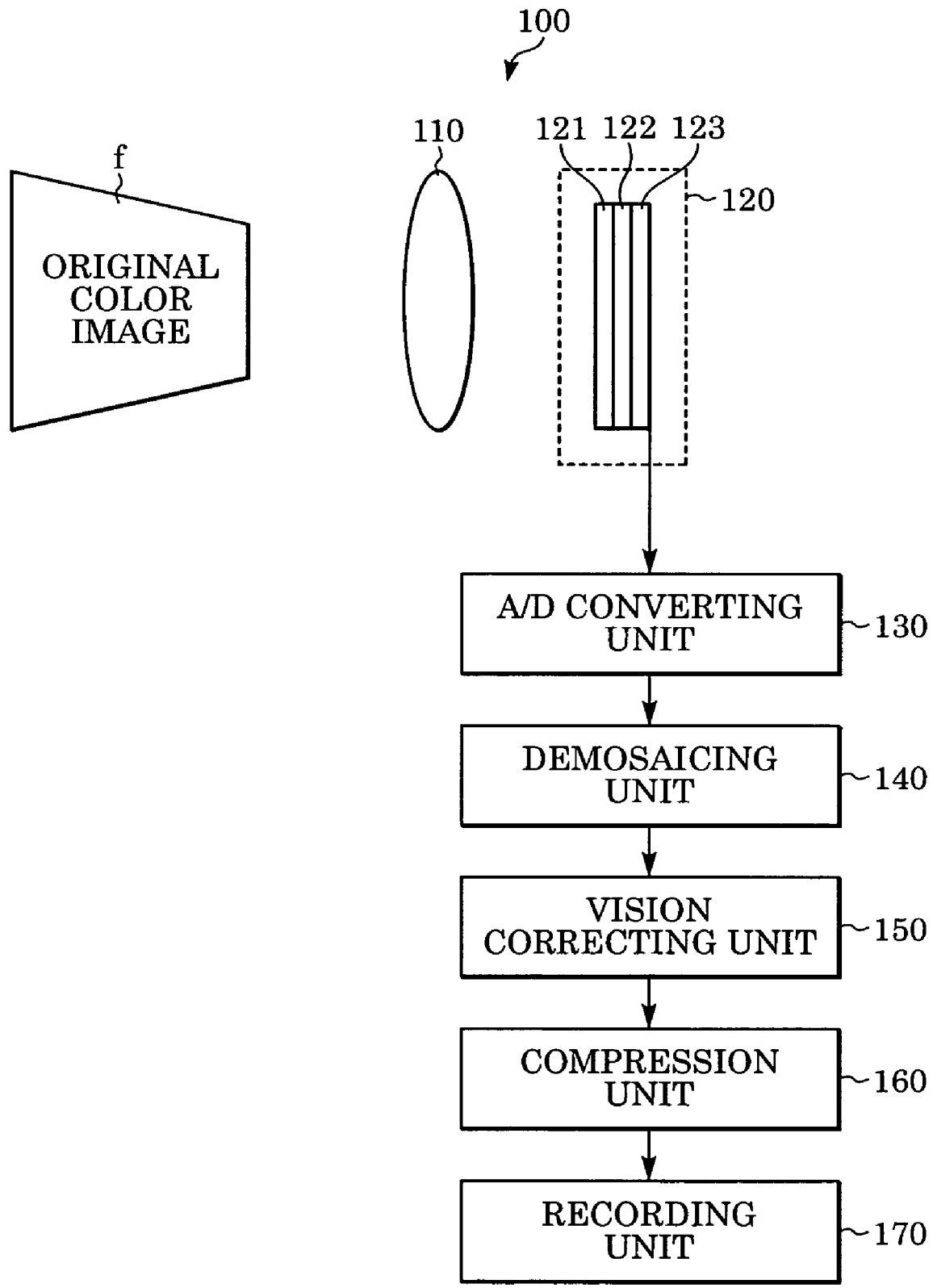
FIG. 2 is a block diagram illustrating the configuration of the color imaging device which executes the image processing method of the first embodiment.

In FIG. 2, the color imaging device 100 includes an imaging optical system 110, a single-CCD color image sensor 120, an A/D (analog-to-digital) converting unit 130, a demosaicing unit 140, a vision correcting unit 150, a compression unit 160, and a recording unit 170. The original color image f illustrated in FIG. 2 hypothetically illustrates the field, and is not a component of the color imaging device 100, but is shown in FIG. 2 for the purpose of explanation.

The photographed original color image f is formed upon the single-CCD color image sensor 120 via the imaging optical system 110. Here, the single-CCD color image sensor 120 includes a color filter array 122 on the front side of a solid-state image sensor 123, and the image which is imaged upon the solid-state image sensor 123 is converted to an analog electrical signal as an R, G, and B color mosaic image (sparsely color sampled image). Further, the image sensor 120 has an optical low-pass filter (LPF) 121, which sorts the light arriving on the pixels into 2×2 pixels, directly in front of the color filter array 122 for moiré suppression.

Figure 3:
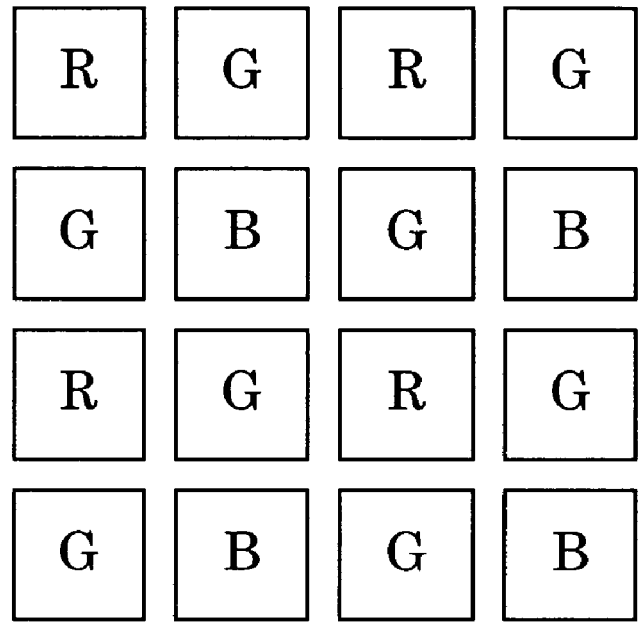
FIG. 3 is a diagram illustrating a Bayer array of a color filter.

If the color filter array 122 is in the Bayer pattern which is widely used, the color filter of one color of R, G, and B is arranged on each pixel as shown in FIG. 3, and only the color corresponding to the color filter of each pixel arrives. Thus, a color mosaic image in which each pixel has only single color information is formed on the solid-state image sensor 123. The solid-state image sensor 123 photoelectrically converts the arriving light (in other words, the color mosaic image of the various colors), and provides this to the A/D converting unit 130 as an electrical signal.

The photoelectrically converted color mosaic image is converted into a digital signal by the A/D converting unit 130 so that signal processing can be performed, and processing follows as to this signalized color mosaic image $g=\{g_{x,y}\}$. Now, the color mosaic image g immediately following A/D conversion is also called RAW data. If the pixel count of the solid-state image sensor 123 is M, then the color mosaic image g can be said to be the vector of the element count M.

In the above-mentioned processing, first the conversion from the color mosaic image g to the estimated color image f″ is performed by the demosaicing unit 140. It is desirable that this estimated color image f″ reproduces the unknown original color image f as true as possible. If the pixel count of the estimated color image f″ is the same as the color mosaic image g, and the color of the various pixels are expressed with three parameters, the estimated color image f″ is the vector of the element count 3M. The image processing method of the present invention relates to this conversion processing, and will be described in detail later. Now, the estimated color image f″ by the demosaicing unit 140 is a bitmap image that linearly reflects the color of the various portions of the image face.

Next, processing is performed by the vision correcting unit 150. In the vision correcting unit 150, processing for improving the appearance of the image is performed as to the estimated color image. For example, image corrections such as tone curve (Gamma) correction, chroma saturation enhancement, and edge enhancement are performed.

Then, in the compression unit 160, the corrected color image is compressed by JPEG or the like, and the size at time of recording is reduced.

The units from the demosaicing unit 140 through the compression unit 160 do not need to be separate devices, rather, these units from the demosaicing unit 140 through the compression unit 160 can be formed on a single microprocessor. The digital image signal thus processed is recorded in the recording unit 170 onto a semiconductor memory such as flash memory or the like, or a recording medium such as an optical disk or a magnetic disk.

Next, the operation of the above-mentioned demosaicing unit 140 will be described with reference to the flowchart in FIG. 1. The processing in the demosaicing unit 140 includes an initial image generating step S141, an image simulating step (simulating unit) S142, a comparison step (comparison unit) S143, an inverse projection step (converting unit) S144, an image penalty calculating step (penalty calculating unit) S145, a feedback step (correcting unit) S146, a convergence determining step S147, and an output step S148. Of these, the image simulating step S142 through the convergence determining step S147 form a repetitive loop, and are repeated multiple times.

Further, the demosaicing unit 140 receives the color mosaic image g from the A/D converting unit 130 as input data, and as fixed data referenced in the image simulating step S142 and the inverse projection step S144, the system (conversion by the imaging optical system 110, the optical low-pass filter 121, the color filter array 122 and the like) information of the estimated color image f″ is retained as a variable.

Here, the various operational steps in the demosaicing unit 140 are executed by the computer program, but by managing each step as a unit (section), the demosaicing unit 140 functions as an image processing device including the above-mentioned various units.

Next the operation of the various steps shown in FIG. 1 will be described. First, an initial image $f^0$ of the estimated color image f″ is generated in the initial image generating step S141. Here, the estimated color image f″ shall be of the same horizontal and vertical size as the color mosaic image, and shall be the expression $f''=\{f^R, f^G, f^B\}=\{f^R_{x,y}, f^G_{x,y}, f^B_{x,y}\}$ from the bitmap image which has the luminance value of RGB for each pixel. The initial estimated color image $f^0$ generated in this step does not influence the final generated color image, and therefore any color image can be used. For example, an image using the one color white or the one color black can be the initial estimated color image $f^0$. However, the number of later repetitions can be reduced if the initial estimated color image $f^0$ is as close to possible to the unknown original color image f, therefore generating the initial estimated color image $f^0$ by a demosaicing process using a traditional technique such as bi-linear filtering is desirable.

In the image simulating step S142, the estimated color mosaic image g″, which is likely to have been obtained when the estimated color image f″ was the original color image f, is generated as to the estimated color image f″. In the color imaging device 100, the original color image f is influenced by the imaging optical system 110, the optical LPF 121, the color filter array 122, the imaging sensor 123 and the A/D converting unit 140 before it becomes the color mosaic image g, and therefore the actions performed by the system on the original color image f are also performed as to the estimated color image f″. These actions are described below.

First, in the imaging optical system 110, distortion or astigmatism of the image can occur. These are expressed as a convolution image space filter and the like. Further, in the case of a chromatic aberration in the imaging optical system 110, this can be handled by applying differing image space filters to each of the RGB color planes.

In the optical LPF 121, if the light arriving on the pixels as described above is sorted into 2×2 pixels, the kernel on the pixel face can be said to be the convolution that is $$K = \begin{pmatrix} 0 & 0 & 0 \\ 0 & 1 & 1 \\ 0 & 1 & 1 \end{pmatrix} \bigg/ 4 \qquad (19)$$

If the aberration of the optical system is ignored, the color $\{f'^{R}_{x,y}, f'^{G}_{x,y}, f'^{B}_{x,y}\}$, which is cast in the color filter corresponding to the various pixels in the color filter array 122, becomes $$\begin{pmatrix} f'^{R}_{x,y} \\ f'^{G}_{x,y} \\ f'^{B}_{x,y} \end{pmatrix} = \begin{pmatrix} (K * f^{R})_{x,y} \\ (K * f^{G})_{x,y} \\ (K * f^{B})_{x,y} \end{pmatrix} \quad (20)$$

Now, if the point spread function (PSF) is said to be the aberration of the imaging optical system 110, this becomes $$K = PSF * \begin{pmatrix} 0 & 0 & 0 \\ 0 & 1 & 1 \\ 0 & 1 & 1 \end{pmatrix} / 4 \quad (21)$$

Further, the influence of the color filter array 122, the solid-state image sensor 123 and the A/D converting unit 140 is expressed as $$g_{x,y} = \begin{pmatrix} R^{R}_{x,y} \\ R^{G}_{x,y} \\ R^{B}_{x,y} \end{pmatrix} \cdot \begin{pmatrix} f'^{R}_{x,y} \\ f'^{G}_{x,y} \\ f'^{B}_{x,y} \end{pmatrix} \quad (22)$$

which is the inner product calculation from the color response vector $R_{x,y} = (R^{R}_{x,y}, R^{G}_{x,y}, R^{B}_{x,y})$, as the color response conversion from the color cast in per pixel $\{f^{R}_{x,y}, f^{G}_{x,y}, f^{B}_{x,y}\}$ to the A/D converting output value $g_{x,y}$. The subscript x.y is added to the color response vector R because the color filter array has different color transmission characteristics for each pixel. Now, the quantization by the A/D conversion is ignored here.

The above influences are all linear conversions, and so a summary of these influences can be expressed in the determinant g=Af. This A is a system matrix.

In other words, in the image simulation step S142, the calculation g″=Af″ is performed. The system matrix A becomes a huge matrix of M×3M, and therefore keeping this in the form of a matrix is unrealistic, but the above-described combination of convolution and color response can be performed as $$g_{x,y} = \begin{pmatrix} R^{R}_{x,y} \\ R^{G}_{x,y} \\ R^{B}_{x,y} \end{pmatrix} \cdot \begin{pmatrix} (K * f^{R})_{x,y} \\ (K * f^{G})_{x,y} \\ (K * f^{B})_{x,y} \end{pmatrix} \quad (23)$$

as to f″, and thus can find the estimated color mosaic image (second image) g″ from the estimated color image f″. The color response vector R and the convolution kernel K are fixed values as to the system, and are previously kept as system information data. Further, this system information data is not limited to a numerical value table, and also indicates the calculation expressions of K* or the regularity of a filter array. The estimated color mosaic image g″ thus obtained is used in the comparison step S143.

In the comparison step S143, comparison is performed of the estimated color mosaic image g″ generated in the image simulating step S142 and the color mosaic image g obtained from the A/D converting unit 130, and the difference d″=g−g″ thereof is forwarded to the inverse projection step S144.

In the inverse projection step S144, the difference d″ in the color mosaic image space obtained from the comparison step S143 is converted to the vector e″ in the color image space.

This becomes a pair with the conversion g″=Af″ which was performed from the estimated color image f″ to the estimated color mosaic image g″ in the image simulating step S142, and can be calculated by the combination of color distribution calculation and inversion convolution.

The color distribution calculation can calculate $$\begin{pmatrix} e'^{R}_{x,y} \\ e'^{G}_{x,y} \\ e'^{B}_{x,y} \end{pmatrix} = \begin{pmatrix} R^{R}_{x,y} \\ R^{G}_{x,y} \\ R^{B}_{x,y} \end{pmatrix} d^{n}_{x,y} \quad (24)$$

using the above-described color response vector $R_{x,y}$, and the inversion convolution is a convolution in which the aforementioned convolution kernel K is the 180° rotated rot 180(K), yielding $$\begin{pmatrix} e^{R}_{x,y} \\ e^{G}_{x,y} \\ e^{B}_{x,y} \end{pmatrix} = \begin{pmatrix} (rot180\,(K) * e'^{R})_{x,y} \\ (rot180\,(K) * e'^{G})_{x,y} \\ (rot180\,(K) * e'^{B})_{x,y} \end{pmatrix} \quad (25)$$

If the convolution kernel as previously shown is $$K = \begin{pmatrix} 0 & 0 & 0 \\ 0 & 1 & 1 \\ 0 & 1 & 1 \end{pmatrix} / 4 \text{ then} \quad (26)$$

$$rot180\,(K) = \begin{pmatrix} 1 & 1 & 0 \\ 1 & 1 & 0 \\ 0 & 0 & 0 \end{pmatrix} / 4 \quad (27)$$

holds.

On the other hand, in the penalty calculation step S145, the minute amount of correction $\{\Delta f''|U(f''+\Delta f'')>U(f'')\}$ of the estimated color image f″ which increases the defined penalty function U(f″) as to the estimated color image f″ is calculated. In the present embodiment, this is $$\delta f^{nY} = f^{nY} - \text{smooth}(f^{nY}) \quad (28)$$

$$\delta f^{nCb} = \frac{\Delta_{x,y} f^{nCb}}{(\Delta_{x,y} f^{nY})^2 + d}$$

$$\delta f^{nCr} = \frac{\Delta_{x,y} f^{nCr}}{(\Delta_{x,y} f^{nY})^2 + d}$$

Here, $\Delta_{x,y}$ is a Laplacian filter, and is $$\Delta_{x,y} f^X \equiv \begin{pmatrix} 1 & -2 & -1 \\ -2 & 12 & -2 \\ -1 & -2 & -1 \end{pmatrix} \Big/ 12 * f^X \qquad (29)$$

The fudge factor d is a typical value of $(\Delta_{x,y} f^{nY})^2$, and for example is the median value. Further, $$\mathrm{smooth}(f^X) = t \cdot \mathrm{median}(f^X) + (1-t) \begin{pmatrix} 1 & 2 & 1 \\ 2 & 4 & 1 \\ 1 & 2 & 1 \end{pmatrix} \Big/ 16 * f^X \qquad (30)$$

The median (f') is a median filter as to a single color image, and t is a parameter for image quality adjustment, and t=1 generates an estimated color image with sharp edges, while t=0 generates a smoother estimated color image $f^Y, f^{Cb}, f^{Cr}$ are the color planes of the estimated color image f within the YCbCr color space, wherein $$\begin{pmatrix} f^Y \\ f^{Cb} \\ f^{Cr} \end{pmatrix} = \begin{pmatrix} 0.30 & 0.59 & 0.11 \\ -0.17 & -0.33 & 0.50 \\ 0.50 & -0.42 & -0.08 \end{pmatrix} \begin{pmatrix} f^R \\ f^G \\ f^B \end{pmatrix} \qquad (31)$$

and, with regard to $\delta f = \{\delta f^R, \delta f^G, \delta f^B\}$, $$\begin{pmatrix} \delta f^R \\ \delta f^G \\ \delta f^B \end{pmatrix} = \begin{pmatrix} 1.00 & 0 & 1.40 \\ 1.00 & -0.34 & -0.71 \\ 1.00 & 1.77 & 0 \end{pmatrix} \begin{pmatrix} \delta f^Y \\ \delta f^{Cb} \\ \delta f^{Cr} \end{pmatrix} \qquad (32)$$

However, as a different color space YCbCr, benefiting from the feature of the Bayer array which has twice as many G pixels as R or B pixels, the following can be said.

$$\begin{pmatrix} f^Y \\ f^{Cb} \\ f^{Cr} \end{pmatrix} = \begin{pmatrix} 1/4 & 2/4 & 1/4 \\ -1/6 & -2/6 & 3/6 \\ 3/6 & -2/6 & -1/6 \end{pmatrix} \begin{pmatrix} f^R \\ f^G \\ f^B \end{pmatrix} \qquad (33)$$

$$\begin{pmatrix} \delta f^R \\ \delta f^G \\ \delta f^B \end{pmatrix} = \begin{pmatrix} 1 & 0 & 3/2 \\ 1 & -3/4 & -3/4 \\ 1 & 3/2 & 0 \end{pmatrix} \begin{pmatrix} \delta f^Y \\ \delta f^{Cb} \\ \delta f^{Cr} \end{pmatrix}$$

In the feedback step S146, based on the vector $e^n$ in the color image space obtained from the inverse projection step S144 and the minute amount of correction $\Delta f^n$ obtained from the penalty calculating step S145, the estimated color image $f^n$ is corrected by $$f^{n+1} = f^n + \mu(e^n - \beta \delta f^n) \qquad (34)$$

and a new estimated color image (the third image) $f^{n+1}$ is generated. In the feedback step S146, it is not necessary to correct based on both the vector $e^n$ and the minute amount of correction $\Delta f^n$, as the estimated color image may be correct based on at lest one of them. However, in both cases, it is desirable that the estimated color image, which is generated by repeating the correction step of the feedback step S146, becomes the output image. The repeating of the correction step based on both the vector and the minute amount of correction is performed at least one time, and preferably multiple times.

The µ in the above-mentioned expression is a parameter for denoting the stride of successive neighbors, and has the value of 0<µ<2, for example, in this embodiment µ=approximately 0.5. Further, β is a balance parameter of the "naturalness" of the generated final image (the estimated color image as the out put image) $f^m$ and the "trueness" of the color mosaic image, wherein the smaller this β is, the "truer" the final image $f^m$ to the color mosaic image, and the greater this β is, the more "natural" the final image can be obtained. Here "true" means that |g−Af| is small, and "natural" means that U(f) is small. Further, a value of β such that the final image $f^m$ becomes $$\left( \frac{g - Af^m}{\sigma} \right)^2 \text{through } M \qquad (35)$$

is desirable, and the minute amount $\delta f^n$ of correction of the present example should be $\beta - 10\sigma^2$ as to the proportion σ of the photometry error seen in the color mosaic image g. However, β is used as a logarithm and thus does not affect the final image greatly, whether $\beta - \sigma^2$ or $\beta - 100\sigma^2$ is used.

In the convergence determining step S147, the convergence of successive neighbors is determined, and if converged, the processing is moved to the output step S148, and if not converged, the processing is moved to the image simulating step S142 and the penalty calculating step S145.

As for a convergence determining method, the feedback amount $(e^n - \beta \delta f^n)^2$ in the feedback step S146 should be at a fixed threshold or the case that is greater than the previous feedback amount $(e^{n-1} - \beta \delta f^{n-1})^2$, Further, convergence can also be said to have taken place when the repetitions reach a fixed number, or when the processing time reaches a fixed time.

In the output step S148, the estimated color image at that point in time is the final image of the present demosaicing processing 140, and this is then handed to the vision correcting unit 150.

Thus, the residual from step S142 to step S144, and the correction from the penalty function in step S145 are combined and repeatedly applied, and thus complicated correlation detecting or direction-selective adaptation processing is not performed, and a high quality color image $f^m$ with high resolution and low false color can be generated.

Further, according to the present embodiment, noise reduction based on the Gaussian statistical model is performed, thus blurring from pixel interpolation does not occur, and since the influence of the optical LPF is compensated for, noise reduction or edge correcting in the vision correcting unit 150 is unnecessary.

Second Embodiment

The demosaicing process described in the first embodiment is an appropriate method in the case in which the noise generated in the solid state image sensor 123 and the A/D converting unit 130 is modeled, assumed to follow a Gaussian distribution. This is applicable to the case with noise wherein the dark current of the solid-state image sensor 123 is dominant.

On the other hand, with the combination of a solid-state image sensor with high sensitivity and low noise and an A/D converting unit, the output of the A/D converting nears the photon count, the quantum Poisson noise becomes the dominant noise. In the present embodiment, an appropriate demosaicing process including noise reduction will be described as to a color imaging device that has a high sensitivity and low noise solid-state image sensor.

The demosaicing process of the present embodiment performs processing according to the same flowchart as in the first embodiment; however, the operations of the comparison step S143, the inverse projection step S144, and the feedback step S146 are different, and some caution is required in the initial image generating step S141. These will be described below.

First, in the initial image generating step S141, the initial image $f^0$ of the estimated color image $f^n$ is generated. With the present invention, the value of the various element of the estimated color image $f^n$ is a non-negative value, and an element that has once been zero will not become a positive value. Thus, even in the initial image, any elements other than those that will clearly be zero in the final image are required to be positive. An initial image that fulfills this condition may be, for example, a demosaicing image from bi-linear filtering or an image of the one color white, and this shall be the initial image $f^0$.

In the comparison step S143, a comparison is performed of the estimated color mosaic image $g^n$ generated in the image simulating step S142 and the color mosaic image g obtained from the A/D converting unit 130, and the ratio thereof which is $d^n = g/g^n$ is moved to the inverse projection step S144.

In the inverse projection step S144, the ratio $d^n$ in the color mosaic space obtained from the comparison step S143 is converted to the vector $e^n$ in the color image space.

In the feedback step S146, based on the vector $e^n$ in the color image space obtained from the inverse projection step S144 and the minute amount of change $\Delta f^n$ obtained from the penalty calculating step S145, the estimated color image $f^n$ is corrected to be $$f^{n+1} = \left( \frac{e^n}{A^t 1 \times (1 + \beta \delta f^n)} \right)^u f^n \qquad (36)$$

and a new estimated color image $f^{n+1}$ is obtained. $A^t 1$ is a correction factor of the inverse projection, and is expressed as $$\begin{pmatrix} (A^t 1)^R_{x,y} \\ (A^t 1)^G_{x,y} \\ (A^t 1)^B_{x,y} \end{pmatrix} = \begin{pmatrix} (rot180(K) * R^R)_{x,y} \\ (rot180(K) * R^G)_{x,y} \\ (rot180(K) * R^B)_{x,y} \end{pmatrix} \qquad (37)$$

Also, as with the first embodiment, when the cycle of the color filter array 122 and the size of the convolution kernel are equal, all pixels of the correction factor $A^t 1$ is the average value of a color response vector, $$\begin{pmatrix} (A^t 1)^R_{x,y} \\ (A^t 1)^G_{x,y} \\ (A^t 1)^B_{x,y} \end{pmatrix} = \begin{pmatrix} \overline{R^R} \\ \overline{R^G} \\ \overline{R^B} \end{pmatrix} \qquad (38)$$

Further, the image penalty calculating step S145 can be the same as in the first embodiment, but in the present embodiment, a differing penalty function $$U(f) = \Sigma_{x,y} [(\nabla_{x,y} f^R)^2 + (\nabla_{x,y} f^G)^2 + (\nabla_{x,y} f^B)^2 - kc\{(\nabla_{x,y} f^R \times \nabla_{x,y} f^G) + (\nabla_{x,y} f^G \times \nabla_{x,y} f^B) + (\nabla_{x,y} f^B \times \nabla_{x,y} f^R)\}] \qquad (39)$$

is considered as an example, and the minute amount of correction $\delta f^n = \nabla_f f^n$ are $$\delta f^{nR} = \nabla_{x,y} f^{nR} - kc(\nabla_{x,y} f^{nG} + \nabla_{x,y} f^{nB})$$

$$\delta f^{nG} = \nabla_{x,y} f^{nG} - kc(\nabla_{x,y} f^{nR} + \nabla_{x,y} f^{nB})$$

$$\delta f^{nB} = \nabla_{x,y} f^{nB} - kc(\nabla_{x,y} f^{nG} + \nabla_{x,y} f^{nG}) \qquad (40)$$

wherein $0 < kc \leq 0.5$, and preferably kc=about 0.2. Further, as $\Delta_{x,y} f^X$ is not easily influenced by the noise, a larger radius is taken as follows.

$$\Delta_{x,y} f^X = \begin{pmatrix} -1 & -4 & -6 & -4 & -1 \\ -4 & -16 & -24 & -16 & -4 \\ -6 & -24 & 220 & -24 & -6 \\ -4 & -16 & -24 & -16 & -4 \\ -1 & -4 & -6 & -4 & -1 \end{pmatrix} / 256 \qquad (41)$$

The other steps (image simulating step S142, convergence determining step S147, and output step S148) are similar to the first embodiment. Also, in order to use the noise reduction by the demosaicing process of the present embodiment effectively, enlarging the convolution radius or $\beta$ of the optical LPF 121 is useful. This is the same with other embodiments as well.

Third Embodiment

As an application differing from the first and second embodiments of the present invention, a color imaging device with a color filter array such as that illustrated in FIG. 4 will be described. The configuration of the color imaging device of the present embodiment is similar to the color imaging device 100 described in the first embodiment, but the color pattern of the color filter array 122 differs from the first embodiment.

The color filter array 122 of the present embodiment has, other than the normal RGB color filters R, G, B, a G filter DG with low transmission, and is a four-color color filter with R, G, B, and DG. The color response vector in the RGB color space of the pixels corresponding to the various color filters shall be $$\begin{pmatrix} 1 \\ 0 \\ 0 \end{pmatrix}, \begin{pmatrix} 0 \\ 1 \\ 0 \end{pmatrix}, \begin{pmatrix} 0 \\ 0 \\ 1 \end{pmatrix}, \begin{pmatrix} 0 \\ 0.2 \\ 0 \end{pmatrix} \qquad (42)$$

Further, the solid-state image sensor 123 and the A/D converting unit 130 attain output saturation (luminescence saturation) even if the light is cast into the pixels with an intensity greater than 1, and the output from these pixels is fixed to 1.

Even with such a color imaging device, the flowchart of the demosaicing unit 140 is similar to the first embodiment (FIG. 1). However, in the image simulating step S142, the above-described output saturation is considered. In the first embodiment the output saturation was ignored, and the linear calculation $g^n = A f^n$ is performed, but in the present embodiment, a non-linear conversion (function) P as a function which simulates the output saturation is introduced, and is $g''=P(Af'')$. This non-linear conversion P independently acts on the various elements of the vector, and shall be $$P(x) = \begin{cases} x & \text{for } x < 1 \\ 1 & \text{for } x \geq 1 \end{cases} \quad (43)$$

This is one type of a convex set. Also, the other steps S141 and S144 through S148 are the same as the first embodiment (and also the second embodiment).

Using this color imaging device, a single color object of $\{f^R, f^G, f^B\}=\{0, 2, 0\}$ with a strong green is photographed as the original color image. In this case, with the conventional RGB color Bayer array (see FIG. 3), light with an intensity of 2 is cast into the G pixels, but due to the output saturation of these pixels, only the output value of 1 can be obtained from these pixels. Thus, the color mosaic image g that is obtained becomes a color mosaic image g as in FIG. 5, $$g = \begin{pmatrix} 0 & 1 & 0 & 1 \\ 1 & 0 & 1 & 0 \\ 0 & 1 & 0 & 1 \\ 1 & 0 & 1 & 0 \end{pmatrix} \quad (44)$$

and from this color mosaic image, only the estimated color image $\{f^R, f^G, f^B\}=(0, 1, 0)$ can be obtained.

Figure 4:
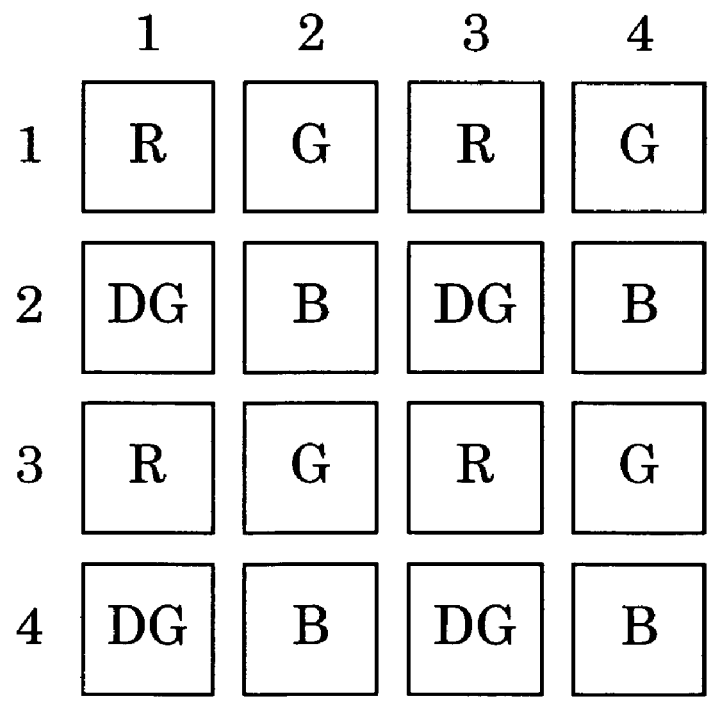
FIG. 4 is a diagram illustrating another color filter array.

However, in the color filter array in FIG. 4, the G pixels cause output saturation, but because the intensity of incoming light of the DG pixels is 0.4 and does not cause output saturation, the color mosaic image g $$g = \begin{pmatrix} 0 & 1 & 0 & 1 \\ 0.4 & 0 & 0.4 & 0 \\ 0 & 1 & 0 & 1 \\ 0.4 & 0 & 0.4 & 0 \end{pmatrix} \quad (45)$$

as illustrated in FIG. 6 can be obtained.

According to the demosaicing processing of the first and second embodiments (that is to say, the present invention), an estimated color image of $\{f^R, f^G, f^B\}=\{0, 2, 0\}$ can be appropriately obtained as to such a color mosaic image. To further describe this, if the estimated color image f'' during the processing is a uniform image where $\{f''^R, f''^G, f''^B\}=\{0, 1, 0\}$, then the image simulating step S142 generates the estimated color mosaic image g'' as 1 as to the G pixels and as 0.2 as to the DG pixels. In the comparison step S143, by means of the comparison thereof, a difference d'' is generated of 0 as to the G pixels and of +0.2 as to the g pixels.

Also, in the inverse projection step S144, if this difference d'' is converted by inverse projection, a color image vector $\{e''^R, e''^G, e''^B\}=\{0, 0.01, 0\}$ where the G plane is 0.01 can be obtained.

Further, in the image penalty calculation step S145, a 0 vector is calculated as the minute amount of correction Δf'' as to the uniform image.

Based on this, the G plane of the estimated color image is increased in the feedback step S146. In the next repetition, the G plane of the estimated color image is a value greater than 1, but in the image simulating step S142, an estimated color mosaic image is generated by the action of the above-described non-linear conversion P for the G plane to be 1 as to the G pixel, and also in the comparison step S143 a difference d'' is generated wherein the G plane is 0 as to the G pixels. Thus, the saturation pixels (in this case the G pixels) do not decrease the value of the estimated color image f'', and therefore a low-sensitivity pixel (in this case the DG pixels) work effectively, and after several repetitions, the estimated color image (final image) f''' becomes the image $\{f^R, f^G, f^B\}=\{0, 2, 0\}$.

Thus, with an imaging device which has an image sensor with pixels in which the sensitivity thereof differ greatly, using the image processing method of the first and second embodiments, a color image can be generated which has a high latitude exceeding the dynamic range of the solid-state image sensor or A/D converting unit. Further, with the present processing, the G pixels and the DG pixels are not combined and are not selectively processed, and therefore the resolution thereof is not inferior compared to the case in which a Bayer array is used.

Even with low-light intensity, smoothing is performed under a fixed amount of pressure by the action of the image penalty calculating step S145, and therefore the noise in the DG pixels is not greatly increased, and is effectively suppressed. Further, this smoothing has weight placed thereupon proportional to the sensitivity of the various pixels, and is statistically optimal.

Figure 9:
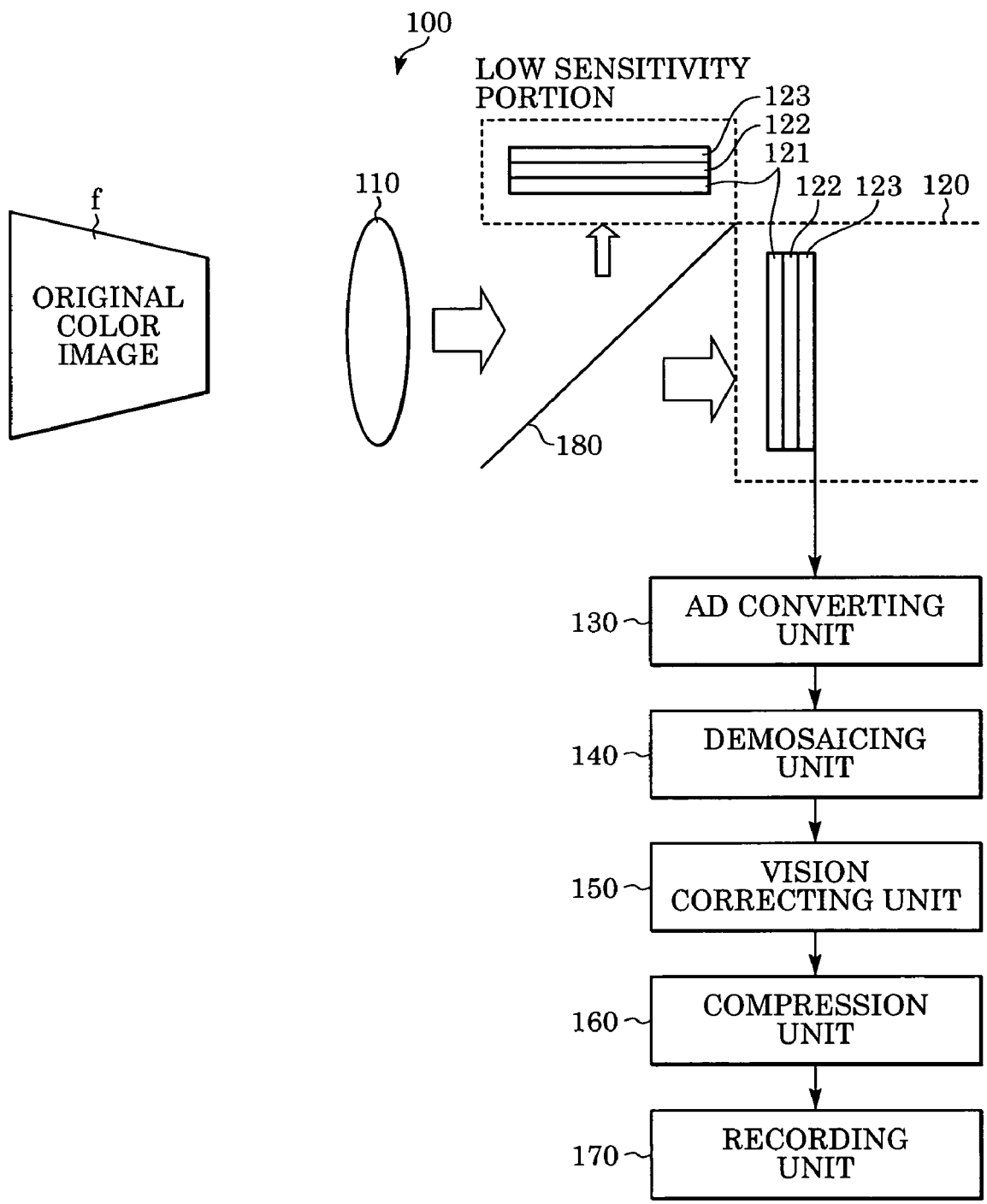
FIG. 9 is a block diagram illustrating the configuration of a color imaging device according to a third embodiment of the present invention.

The low sensitivity pixels are not necessarily formed by a color filter, but can by formed by manipulating the sensitivity by the configuration of the solid-state image sensor 123 or by electrical modulation. Further, as illustrated in FIG. 9, from an optical light beam splitting means such as a half mirror 180, a configuration in which the light emitted from one point of the original color image f is distributed in different ratios to multiple pixels can be considered.

Figure 10:
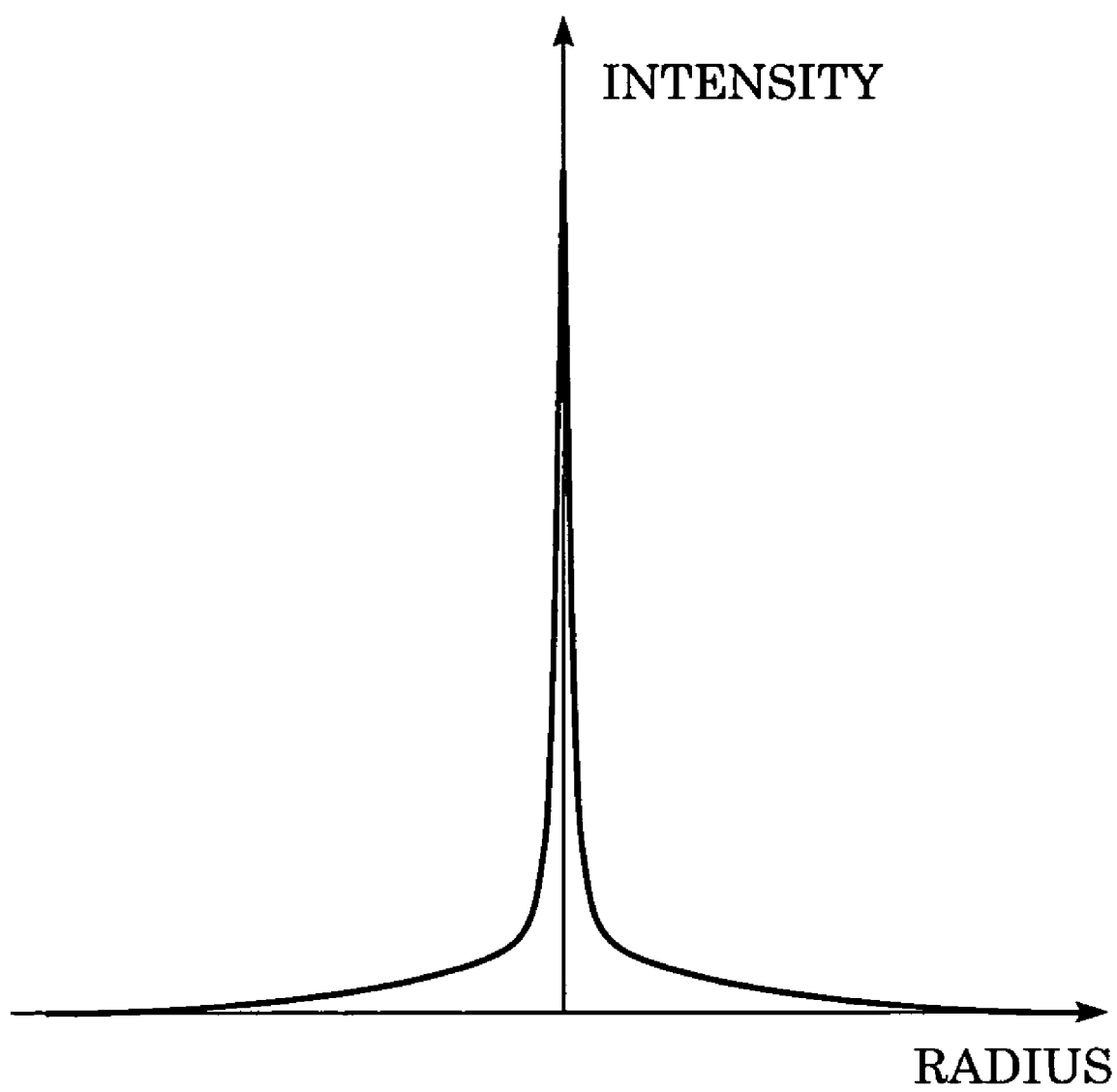
FIG. 10 is a diagram illustrating an example of flare.
Figure 11:
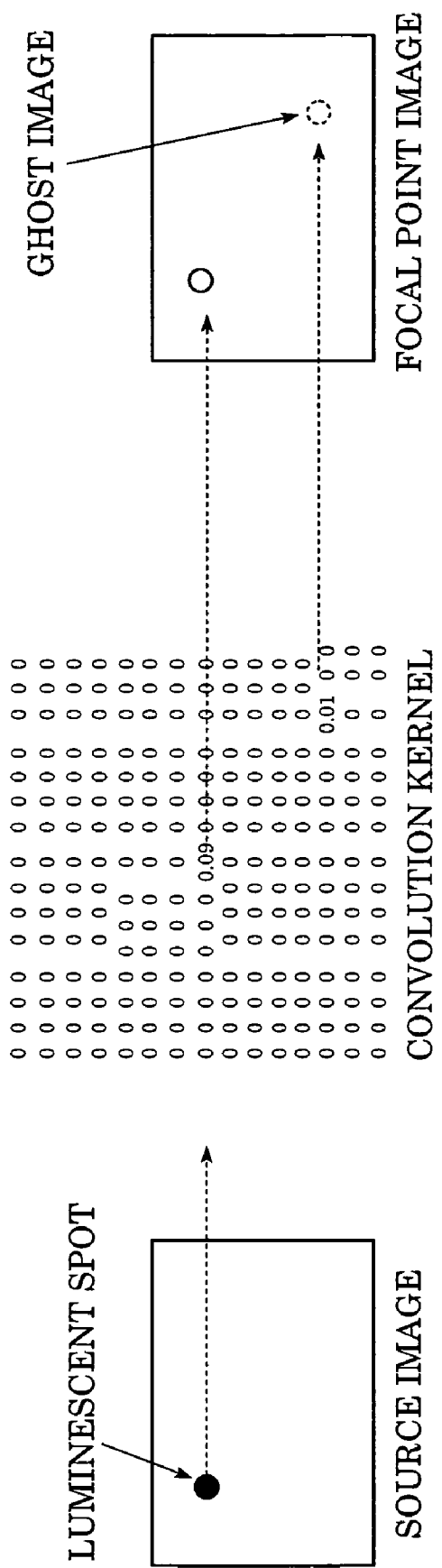
FIG. 11 is a diagram illustrating an example of a ghost image.

As such a distribution means, a ghost image (e.g., see FIG. 11) or flare from an imaging optics system 110 can be considered. In the image simulating step S142, a flare is expressed as a convolution by a PSF (point spread function) wherein the level is extremely low but the hem is spread widely, as illustrated in FIG. 10. Further, a ghost image is expressed as a convolution from a kernel which has a minute element in a position located away from the center, corresponding to the luminescent spot of the original image (location of the ghost image).

In general, a convolution kernel which expresses a ghost image is extremely large, and is a shift variant, therefore simulations using modified or superposed images are best.

If thus processed, the estimated color image output by the image processing method of the present invention will have a high intensity above that of the pixel saturation value from the ghost images or flares of the color mosaic image as to the source thereof, and also will provide an image with no ghost images or flare images.

Figure 7:
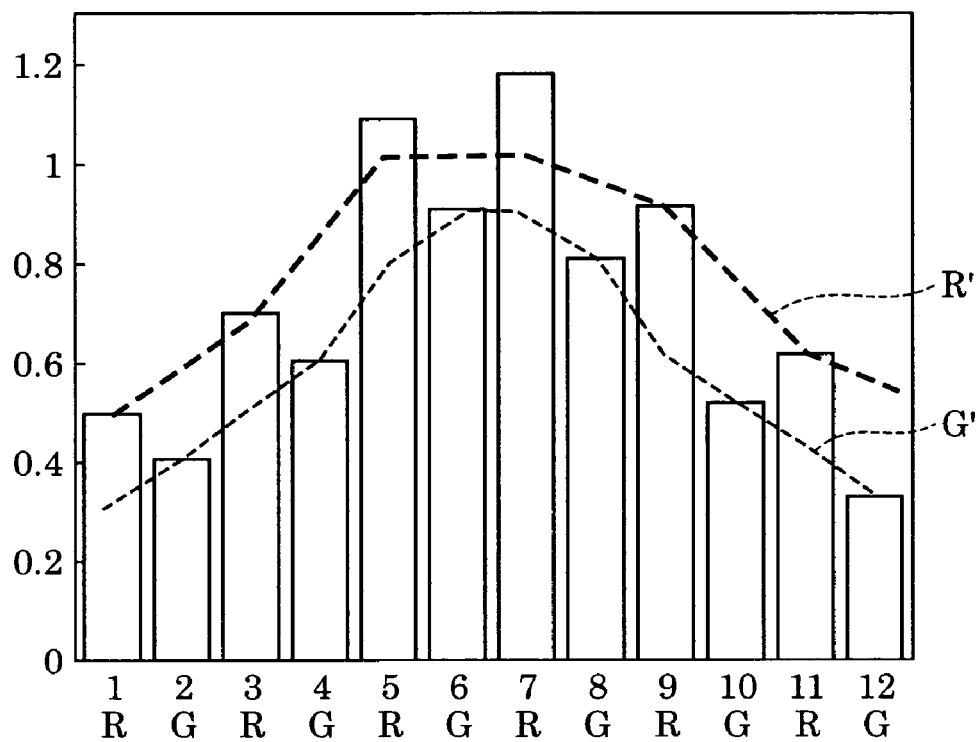
FIG. 7 is a diagram illustrating a random array of a color filter.

Further, as an example of a different original color image according to the present embodiment, a profile such as that shown in the bar graph in FIG. 7 is input in the top row of the image sensor wherein the pixels are arrayed as RGRG. The bars in the bar graph with odd numbers are input into the pixels to which R-color filters are affixed, and the bars in the bar graph with even numbers are input into the pixels to which G-color filters are affixed. In this case, the output of the various pixels from the A/D converting unit 130 becomes the value illustrated by the dotted lines R' and G' in the diagram.

Now, the output of the fifth and seventh R pixels is fixed at 1.0 due to the output saturation. If a demosaicing process using a bi-linear filter which is a conventional method is applied, light intensity greater than that of the saturation value cannot be obtained, and thus the R-band of the estimated color image result in the processing results as the dotted line R' in FIG. 7, and the color balance deteriorates.

However, with the demosaicing processing of the present invention, in the neighborhood of the fifth pixel or the seventh pixel, pressure to minimize the variation between pixels in curvature of luminescence or color difference operates from the action of the image penalty calculating step S145, and the output value of the R-pixels go above 1.0, and thus a correct estimated color image can be obtained.

In particular the effect thereof is reduced blooming or color scattering, and a color image with superior three-dimensional appearance at the image highlights. This example does not involve the DG pixels and therefore we can see that this is effective even with a color imaging device that does not have low-sensitivity pixels, and can be achieved by considering the output saturation of the image simulating step S142.

Fourth Embodiment

With the color imaging device in the first and second embodiments as described above, a color filter array 122 of a color filter array with periodicity is given as an example. However, in the demosaicing processing of the present invention, this periodicity is not used at all. The only constraint with the demosaicing processing of the present invention is that the color response vectors $R_{x,y}$ of the various pixels are given, and a non-periodic color filter array or a color filter array of an arbitrary combination of color response vectors not constrained by RGB colors and complementary colors can be used. Further, the color response vector $R_{x,y}$ does not need to be non-negative, and the color response vector can be $\{R^R, R^G, R^B\}=\{-0.1, 0.07, 0.08\}$ as to the color filter with good transmission of a wavelength of approximately 520 nm, and negative sensitivity as to the red color in the human eye can be reproduced.

Figure 8:
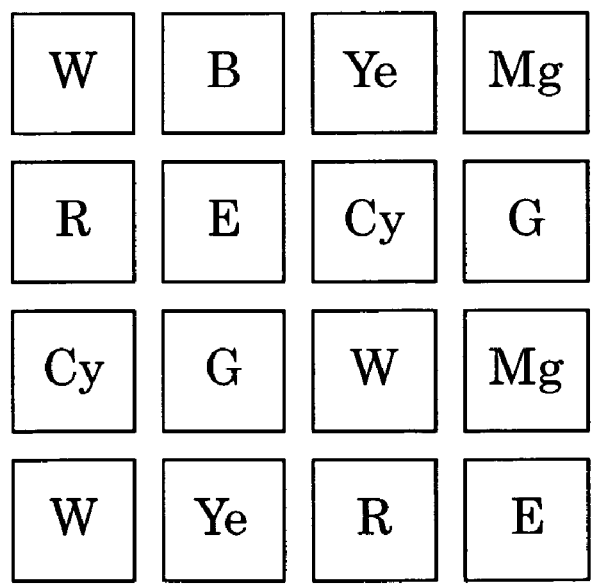
FIG. 8 is a graph illustrating an example of an input profile to the pixels of an image sensor and the output from the pixels.

Using this characteristic, a random color filter array as illustrated in FIG. 8 or a color filter array 122 which uses an arbitrary color filter with the complementary colors Ye, Cy, Mg, or white (transparent filter) W, and blue green (close to 520 nm) E and the like, in addition to the RGB colors R, G, and B, can be used. In this instance, white pixels or complementary color pixels are more easily saturated than RGB color pixels, but this problem can be solved by the method described in the third embodiment, and a high S/N (signal-to-noise) in the dark portions due to the white pixels and the complementary color pixels and a high color reproducibility due to the RGB color pixels can be balanced.

Also, with such a non-periodic color filter array, color moiré does not occur even without an optical LPF, and therefore a configuration without the optical LPF 121 is possible. In a demosaicing processing with a color imaging device without an optical LPF, when the aberration of the imaging optic system 110 can be ignored the convolution processing is not necessary in the image simulating step S142.

Another advantage of this characteristic is that, at the time of manufacturing of the color filter array, even if uneven coating or color mixing among neighboring pixels occurs, these are measured as the color response vector $R_{x,y}$, and if this is stored in a flash memory or the like within the color imaging device as system information within the demosaicing processing, the uneven coating and so forth will not adversely effect the estimated color image. Similarly, dropped-out pixels can be handled by setting the color response vector of the dropped out pixels to 0.

Further, a solid-state image sensor of a checkerboard-pattern sampling which has pixels only in the odd-numbered row and odd-numbered column positions, and in the even-numbered row and even-numbered column positions (honeycomb array), as proposed in Japanese Patent Laid-Open 2001-177767, can be resolved by setting the color response vector to 0 for the pixels in the odd-numbered row and even-numbered column positions and in the even-numbered row and odd-numbered column positions, similarly with the dropped-out pixels.

Fifth Embodiment

In the embodiments up to this point, the estimated color image f'' has been expressed as the bitmap basis expressed $\{f^R_{x,y}, f^G_{x,y}, f^B_{x,y}\}$ of the RGB color expression, but the expression for the estimated color image is not limited to this basis expression, and can use other basis expressions.

Figure 12:
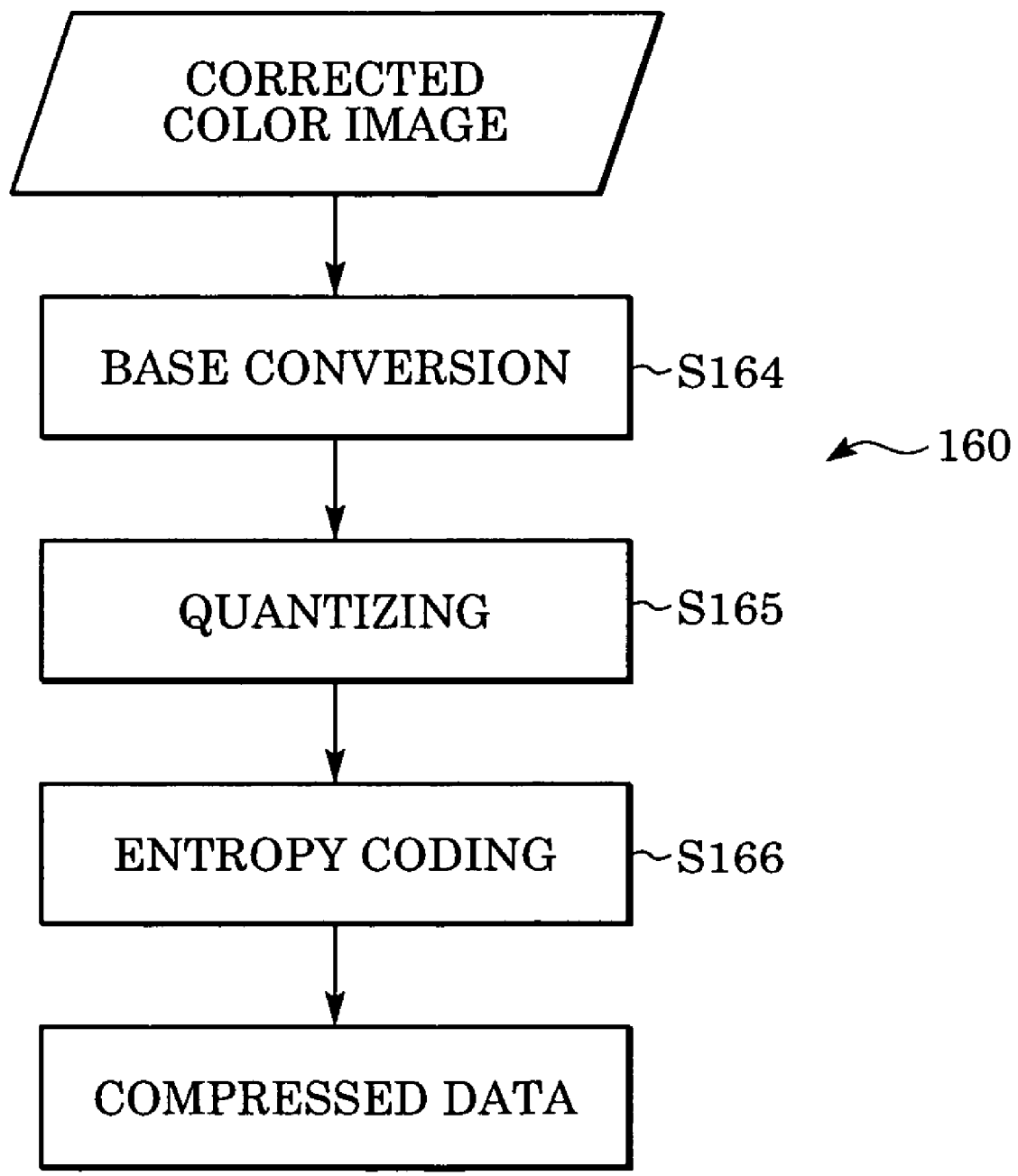
FIG. 12 is a flowchart illustrating the operation of the compression unit of the color imaging device according to a fifth embodiment of the present invention.

In the compression unit 160, as illustrated in the flowchart in FIG. 12, in general after performing basis conversion of the color image (S164), quantization (S165) and entropy coding (S166) is performed. For example, with the currently widely used JPEG image compression method (ISO/IEC JTC110918-1:ITU-T Rec. T. 81 "Information technology—digital compression and coding of continuous-tone still images:Requirements and guidelines" 1994), after the conversion to YUV color space/YUV 4:1:1 down-sampling/block DCT/quantization table multiplication is performed as a basis conversion, the image is quantized, and Huffman coding is used as the entropy coding.

Thus, with the demosaicing processing of the present embodiment, the estimated color image f'' is expressed by a basis after basis conversion (hereafter, this will be called compression base), and the data size after entropy coding will be used as a penalty.

Figure 13:
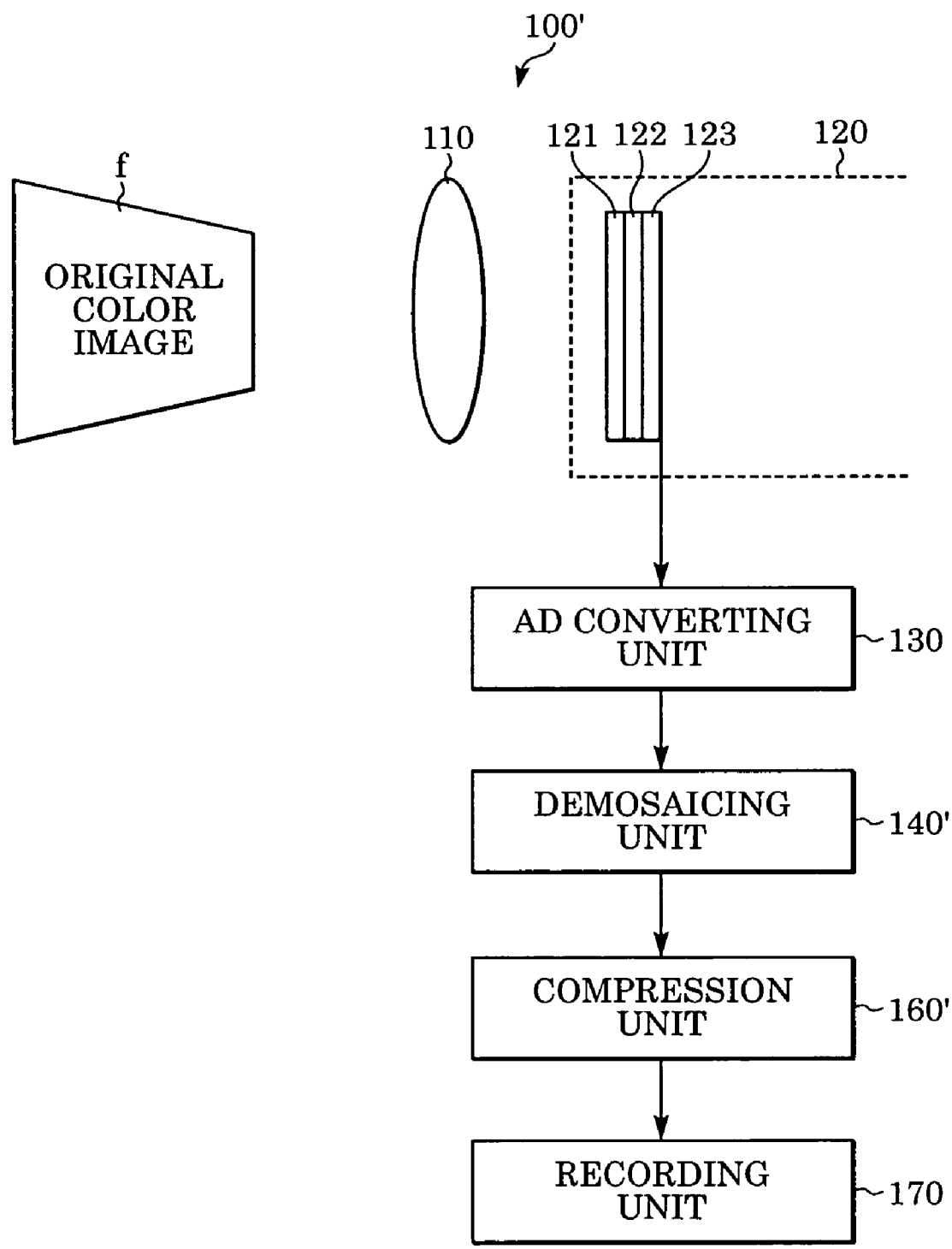
FIG. 13 is a block diagram illustrating the configuration of a color imaging device according to the fifth embodiment.

A configuration example of a color imaging device 100' which uses such an image process is illustrated in FIG. 13. The color imaging device 100' includes an imaging optics system 110, a single-panel color image sensor 120, an A/D converting unit 130, a demosaicing unit 140', a compression unit 160', and a recording unit 170. The imaging optics system 110, the single-panel color image sensor 120, the A/D converting unit 130, and the recording unit 170 are similar to those in the first embodiment.

Figure 14:
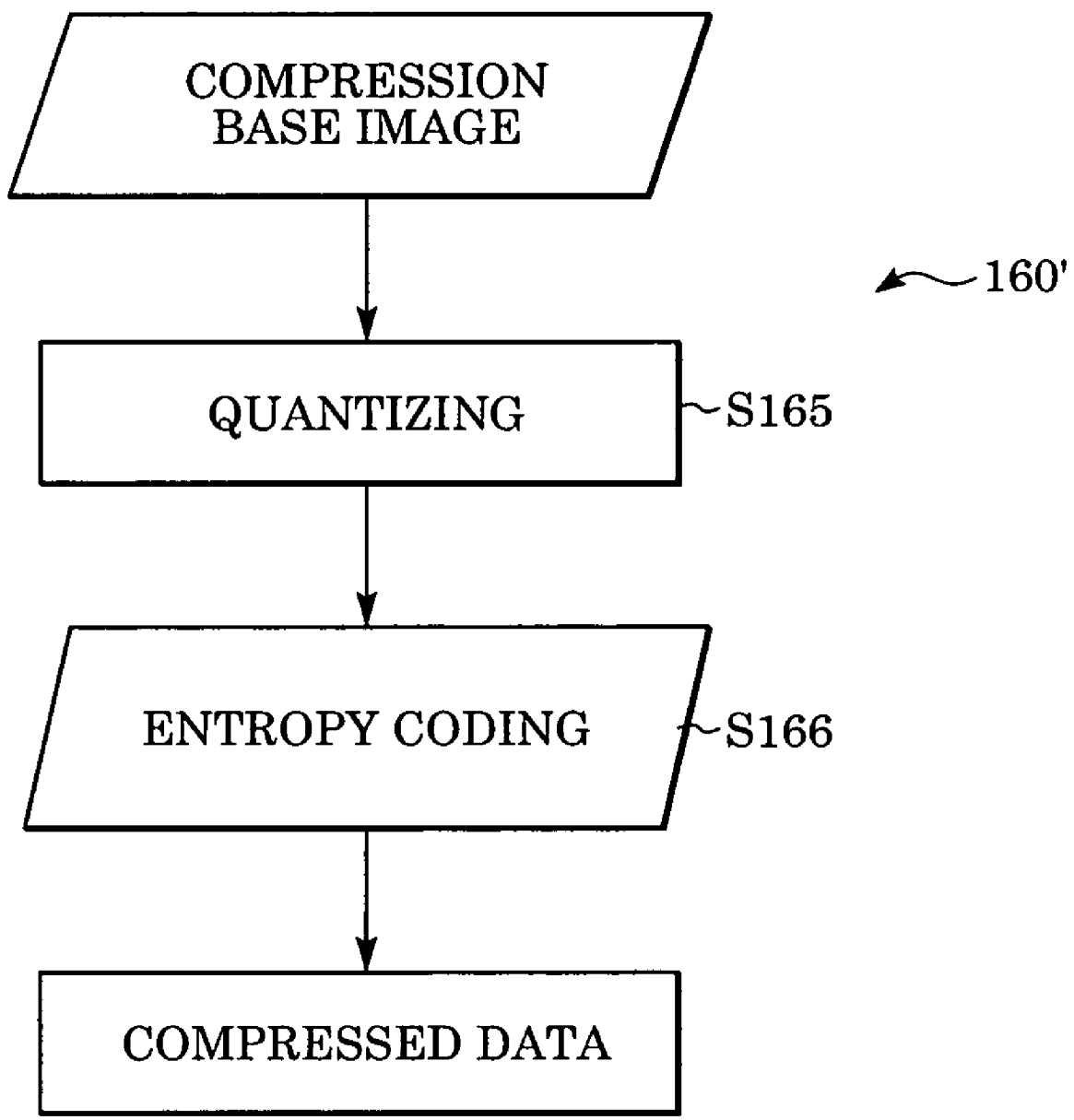
FIG. 14 is a flowchart illustrating the operation of the compression unit of the color imaging device of the fifth embodiment.

With the present embodiment, the output from the demosaicing unit 140' has previously had vision correction or basis conversion performed, and therefore does not have the vision correction unit 150 as in the first embodiment. Further, the compression unit 160' does not perform basis conversion, as illustrated in the flowchart in FIG. 14. In other words, the vision correction unit and the basis converting unit are built into the demosaicing unit 140'.

Figure 15:
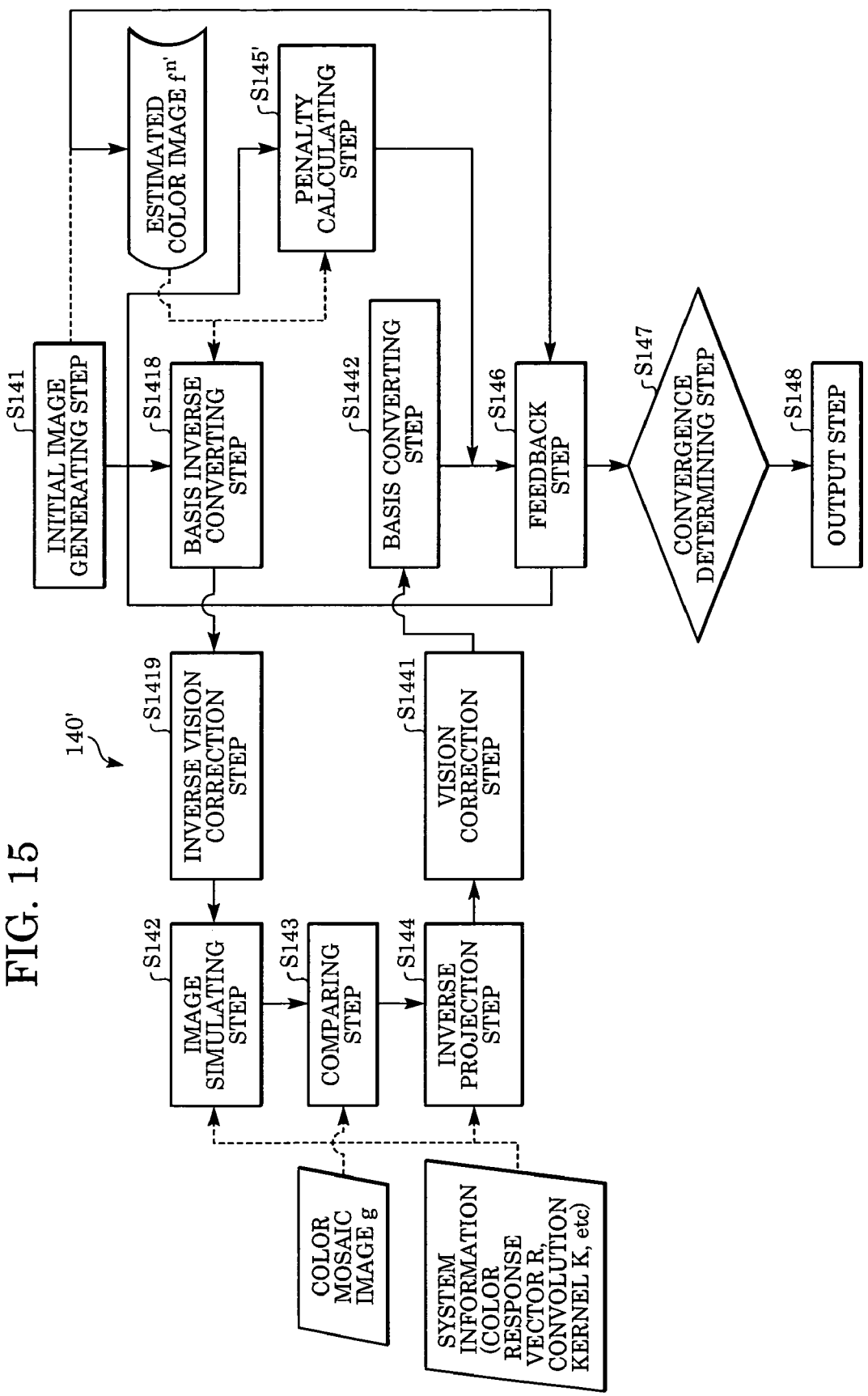
FIG. 15 is a flowchart illustrating the operating of the demosaicing unit of the color imaging device of the fifth embodiment.

The operation of the demosaicing unit 140' will be described using the flowchart shown in FIG. 15. Compared to the flowchart of the demosaicing unit 140 of the first embodiment (see FIG. 1), a basis inverse converting step S1418, an inverse vision correction step S1419, a vision correction step S1441, and a basis converting step S1442 have been newly added. Also, the estimated color image fn' is an image expressed by a compression base, and the image penalty calculating step S145' corresponds to the compression base. The other steps thereof are similar to those in the first embodiment.

In the vision correcting step S1441, the same processing is performed as the vision correcting unit 150 in the first embodiment, and in the basis converting step S1442, the same processing is performed as the compression processing unit 160 in the first embodiment.

In the basis inverse converting step S1418, the inverse processing of the basis converting step S1442 is performed. The estimated color image fn' expressed by a compression basis is converted into a linear bitmap basis expression f". This is one portion of the decompression process of the compression image, and as to the JPEG compression base, quantization table division/block iDCT/YUV 4:4:4 up-sampling/conversion to RGB color space should be calculated.

Further, in the vision inverse correcting step S1419, the inverse processing of the vision correction step S1419 is performed. For example, as to tone curve (Gamma) correction/chroma saturation enhancement/edge enhancement, inverse tone curve (inverse Gamma) correction/chroma saturation degradation/blurring is performed.

Now, the steps from the basis inverse converting step S1418 to the image simulating step S142 cannot be clearly separated, and a conversion that is separated into multiple steps can be bundled together into one step, or the order can be interchanged, for example the optical LPF 121 can be simulated in the state of the DCT base. These can all be said to have the input image f of the image simulating step S142 of the first embodiment expanded so as to correspond to the compression base, in the sense that, as to the estimated color image fn', the estimated color mosaic image g, which is likely to be have been obtained when the estimated color image fn' had been the original color image f, is generated.

Similarly with the inverse projection step S144 through the basis converting step S1442, the output vector e" of the inverse projection step S144 in the first embodiment can be said to have expanded so as to correspond to the compression base.

In the image penalty calculating step S145', the compression data size generated by the compression unit 160' is estimated as to the estimated color image fn', and a minute amount of correction Δf", so as to make this larger is calculated.

The entropy coding of the JPEG image compression can be taken to be Golomb coding, and approximates coding which gives the code length log 2($|f''_i|$+1) as to the elements $f''_i$ of $f''=\{f''_i\}$. Thus, $$\delta f^{n'} = \left\{ \frac{\text{sign}(f_i^{n'})}{|f_i^{n'}|+1} \right\} \text{ and also} \quad (46)$$

$$\text{sign}(x) = \begin{cases} 1 & \text{for } x > 0 \\ 0 & \text{for } x = 0 \\ -1 & \text{for } x < 0 \end{cases} \quad (47)$$

The estimated color image (final image) f''', generated by this demosaicing unit 140' has already been expressed by a compression base, and is an image which is effectively compressed by the compression unit 160'. Thus, the image data size after compression is small, and the volume of the recording unit 170 can be reduced. In general with a natural image compression of JPEG and the like, it is known that the compression data size is larger with a large amount of noise, but this estimated color image f''' has a small image data size after compression, and the image has little noise.

Further, by changing the balance parameter β of the feedback step S146, the balance of the "trueness" of the image and the compression data size can be adjusted.

Sixth Embodiment

Figure 16:
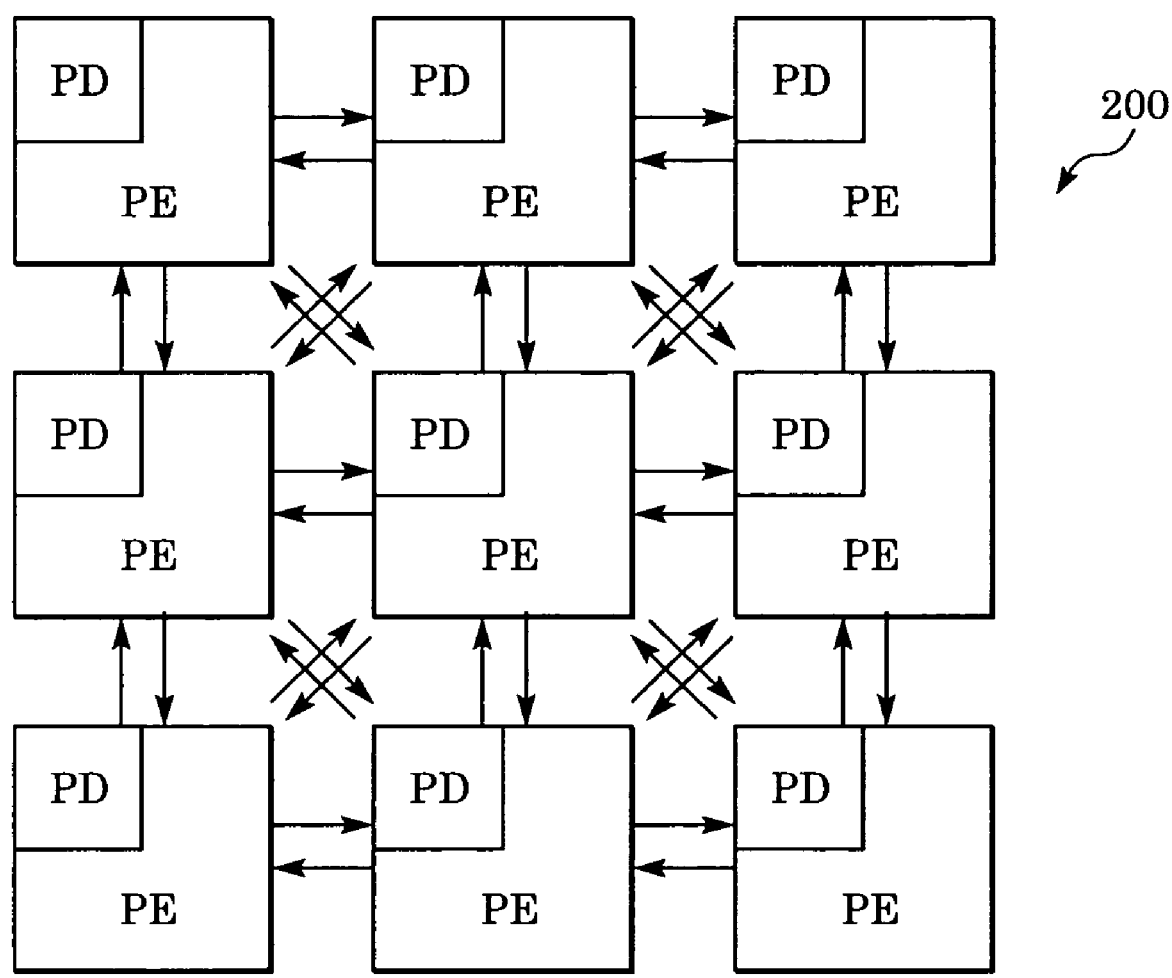
FIG. 16 is a model diagram illustrating the configuration of a processing circuit integrated image sensor used for a color imaging device according to a sixth embodiment of the present invention.

As a further differing embodiment of the present invention, the configuration of an image processing device in which the demosaicing unit is integrated with the solid-state image sensor will be described. The solid-state image sensor has a photo detector (PD) located on a semiconductor, and the solid-state image sensor 200 of the present embodiment includes a processing circuit (PE) on the various photo detectors, as illustrated in FIG. 16, and processing is performed between juxtaposed pixels. Such a solid-state image sensor 200 is called an artificial silicon retina chip or a vision chip. The solid-state image sensor 200, similar to a conventional CMOS-type (complementary metal-oxide semiconductor) image sensor, includes a data line and an address circuit for the purpose of reading out the value from the various processing circuit to an external unit, and as illustrated with arrows in FIG. 16, has connecting wiring for the adjacent processing circuits to share the data.

Figure 17:
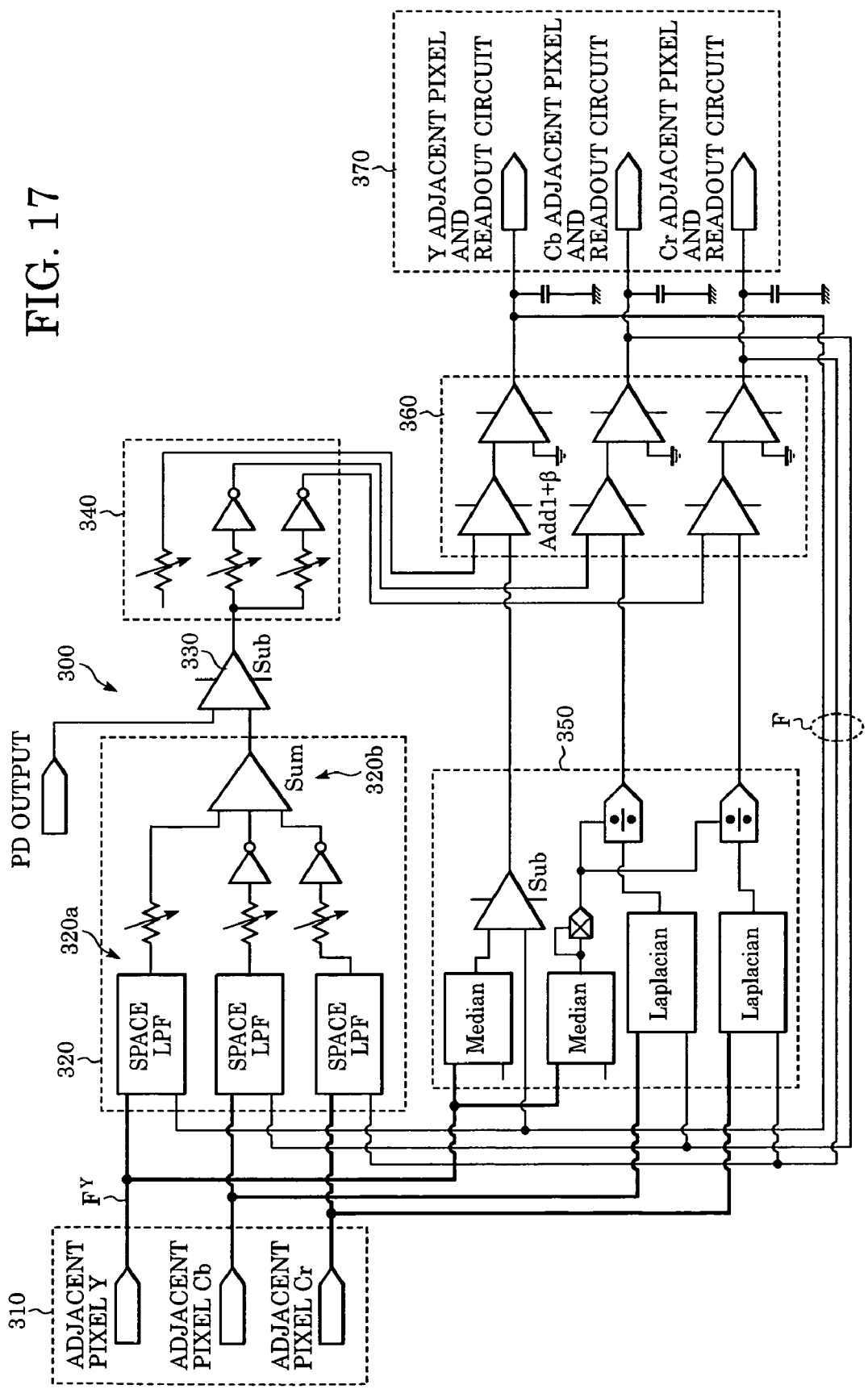
FIG. 17 is a circuit diagram illustrating the configuration of the processing circuit of the sixth embodiment.

The configuration of this processing circuit is illustrated in FIG. 17. This processing circuit 300 includes the various circuit blocks of an image simulating unit 320, a comparison unit 330, an inverse projection unit 340, an image penalty calculating unit 350 and a feedback unit 360, and terminals 310 and 370 which are connected to eight pixels (hereafter referred to as eight adjacent pixels) adjoined to a pixel-of-interest (own pixel, not shown), and a signal line connecting those. Further, of the signal lines, the signal line in particular which retains the pixel value is denoted as F. With the present circuit, let us say that the estimated color image f" is expressed in the YCbCr color space, and the surface color value of the various pixels are expressed by the analog voltage value on the three signal lines F of the various processing circuits.

The terminal 310 is connected to the signal line F of the eight adjacent pixels, and the various signal lines reach the image simulating unit 320 and the image penalty calculating unit 340. The thick signal lines illustrate each of the eight signal lines from the eight adjacent pixels.

The image simulating unit 320 can be divided into the space LPF unit for each color component 320a and the color response unit 320b. The space LPF unit 302a is configured from a combination of an attenuator and an accumulator, and the calorimetric value of the eight adjacent pixels from the terminal 310 and the signal value of the pixels riding on the signal line F can be calculated with the mixed addition of $$\begin{pmatrix} 1 & 2 & 1 \\ 2 & 4 & 2 \\ 1 & 2 & 1 \end{pmatrix} \Big/ 16 \quad (48)$$

With the color response unit 320b, according to the color transmission characteristics of the color filters on these pixels, the output of the various space LPF units 320a of Y/Cb/Cr are calculated with mixed addition from the color response coefficient. For example, if the color of the color filter is green, and the color response vector is $$\begin{pmatrix} R^Y_{x,y} \\ R^{Cb}_{x,y} \\ R^{Cr}_{x,y} \end{pmatrix} = \begin{pmatrix} 1.0 \\ -0.34 \\ -0.72 \end{pmatrix} \quad (49)$$

and the color mosaic image $g_{x,y}$ has a color response of $$g_{x,y} = \begin{pmatrix} R^Y_{x,y} \\ R^{Cb}_{x,y} \\ R^{Cr}_{x,y} \end{pmatrix} \cdot \begin{pmatrix} f^Y_{x,y} \\ f^{Cb}_{x,y} \\ f^{Cr}_{x,y} \end{pmatrix} \quad (50)$$

then this is attenuated at the ratio of Y:Cb:Cr=0.5:0.17:0.36 by the attenuator of the space LPF unit 320a, and Cb and Cr are further reversed by an inverter, and after combining with a attenuator, this is amplified into twice the size.

The constant of this attenuator and the existence of an inverter differs by the color filter of the various pixels, and the damping ratio is Y:Cb:Cr=0.5:0:0.7, and an inverter is not used if the color is red and the color response vector is $$\begin{pmatrix} R^Y_{x,y} \\ R^{Cb}_{x,y} \\ R^{Cr}_{x,y} \end{pmatrix} = \begin{pmatrix} 1.0 \\ 0 \\ 1.4 \end{pmatrix} \quad (51)$$

Also, if the color response coefficient is 0, the connecting wiring to the summing device of the color signal or the space LPF can be omitted.

The comparison unit 330 is a subtracter, and outputs the difference between the voltage which is proportional to the amount of incoming light input from the photo detector (PD) and the output voltage of the image simulating unit 320, into the inverse projection unit 340.

The inverse projection unit 340 distributes the output from the comparison unit 330 according to the color response. The combination of attenuator and inverter used here is desirable that the combination be the same as that used in the image simulating unit 320, but the damping ratio does not need to be the same as the comparison unit 330, and can be omitted. However, the closer the damping ratio is to the comparison unit 330, the better the circuit will be.

Further, with the current embodiment, the circuit corresponding to the space LPF unit 320a of the image simulating unit 320 is omitted, but this has no effect on the operation thereof.

On the other hand, the image penalty calculating unit 350 has a median circuit which connects to the line relating to the luminescence (Y) signal, and also has a Laplacian circuit for each color component. The median circuit includes a combination of a comparator and a selector, and outputs the median value from the nine signal values of the luminescence signal values of the eight peripheral pixels from the terminal 310 and the nine signal values of the luminescence signal value of the own pixels riding on the signal line $F^Y$. The output of the median circuit is connected to the difference circuit, and further the difference with the luminescence signal value of the own pixels riding on the signal line $F^Y$ is transmitted to the feedback unit 360.

The Laplacian circuit includes a combination of the attenuator and the inverter and the summing device, and the nine signal values of the signal values of the eight adjacent pixels from the terminal 310 and the signal value of the pixels riding on the signal line F is combined at the ratio of $$\begin{pmatrix} -1 & -2 & -1 \\ -2 & 12 & -2 \\ -1 & -2 & -1 \end{pmatrix} / 12 \quad (52)$$

Of the output of the Laplacian circuit, the luminescence signal passes through the square circuit and is connected to the divisor side of the division circuit, and the color difference signal is connected to the dividend side of the division circuit, and is proportional to the color difference Cb/Cr, and further the output that inversely correlates to the square value of the luminescence value Y is transmitted to the feedback unit 360. Also, the divisor has a fixed offset d.

The feedback unit 360 includes a summing device and an amplifier, and with the summing device the signal from the inverse projection unit 340 and the signal from the image penalty calculating unit 350 are combined at the ratio of 1:β, and is amplified to the power of k($\gg$1), and is refluxed to the signal line F.

From the terminal 370, the signal line F is connected to the terminal 310 of the eight adjacent pixels and the readout circuit (not shown).

From such a circuit configuration, the voltage $$f^Y_{x,y} = k\left(R^Y(PD \text{ output} - Sim \text{ output}) + \beta(f^Y_{x,y} - \text{median}(f^Y_{x,y}))\right) \quad (53)$$

$$f^{Cb}_{x,y} = k\left(R^{Cb}(PD \text{ output} - Sim \text{ output}) + \beta \frac{\Delta f^{YCb}_{x,y}}{(\Delta f^Y_{x,y})^2 + d}\right)$$

$$f^{Cr}_{x,y} = k\left(R^{Cr}(PD \text{ output} - Sim \text{ output}) + \beta \frac{\Delta f^{YCr}}{(\Delta f^Y_{x,y})^2 + d}\right)$$

can be obtained as to the voltage values $f^Y_{x,y}$, $f^{Cb}_{x,y}$, $f^{Cr}_{x,y}$ on the signal line F within the pixels x, y. Also, $$Sim \text{ output} = \begin{pmatrix} R^Y_{x,y} \\ Rf^{Cb}_{x,y} \\ R^{Cr}_{x,y} \end{pmatrix} \cdot \begin{pmatrix} K*f^y_{x,y} \\ K*f^{Cb}_{x,y} \\ K*f^{Cr}_{x,y} \end{pmatrix}, k = \begin{pmatrix} 1 & 2 & 1 \\ 2 & 4 & 2 \\ 1 & 2 & 1 \end{pmatrix} / 16 \quad (54)$$

With this relational expression, if k is sufficiently large in k$\gg$1, the absolute value within the right parentheses becomes an extremely small value. In other words, an image wherein the estimated error (PD output−Sim output) of the first term on the right side in $\{f^Y_{x,y}, f^{Cb}_{x,y}, f^{Cr}_{x,y}\}$ and the penalty gradient of the second term relating to β is balanced is generated. Similar to the first embodiment, a high quality color image is obtained in which false color is reduced and noise is suppressed.

Thus, according to the present embodiment, a color image which has been demosaiced can be directly obtained from the solid-state image sensor 200.

Also, using the present imaging sensor in motion photography is particularly effective, since the color image immediately following the changing PD output can be continuously obtained.

Seventh embodiment

In the above embodiments, the case of integrating the image processing device of the present invention into a color imaging device was described, but the color imaging unit can record the color mosaic image output from the A/D converting unit 130 without change to a recording medium in the recording unit 170, and this recorded color mosaic image can be converted to a color image with an image processing device formed from a separate computer, and the present invention can thus be executed. In this case, the computer would have installed the image processing program which performs the demosaicing processing of the present invention.

The image processing program 300 includes a recorded data reading step S310, a demosaicing step S320, a vision correcting step S330, and a storing step S340, as illustrated in FIG. 20.

In the recorded data reading step S310, the color mosaic image is read from the color imaging device or recording medium which has a single-panel image sensor connected to a computer (image processing device), and is copied to the memory on the computer as a color mosaic image g. Also, in the case in which the color mosaic image on the recording medium is compressed or encoded, decompression or decoded is performed at the time of copying.

Further, the color filter array in the image sensor of the color imaging device wherein the color mosaic image is recorded, or the color response vector R and convolution kernel K of the various color filters are written into the memory of the computer as system information, and this system information is sent to the demosaicing step S320.

In the demosaicing step S320, the color mosaic image g and the system information in the memory is referenced and an estimated color image f″ is generated, and this is passed on to the vision correction step S330. The processing in the demosaicing step is the same processing as that in the demosaicing unit 140 described in the first embodiment.

In the vision correcting step S330, processing for improving the appearance of the image is performed as to the estimated color image, as the vision correcting processing. For example, image correction such as tone curve (Gamma) correction, chroma saturation enhancement, and edge enhancement (unsharp mask) are performed. The corrected image is stored in a recording medium within the computer such as a hard disk and the like, in the storing step S340. In this instance, processing such as compression and so forth is performed as required.

Using such an image processing device (image processing program), a demosaicing unit or a vision correcting unit becomes unnecessary for a color imaging device, and the microprocessor loaded on a color imaging device can be simplified.

The above-described various embodiments are summarized below. The image processing method described in the various above-described embodiments includes: an image simulating step, a comparison step, an inverse projection step, an image penalty calculating step, and a feedback step, as described in the overview of the above-described image processing method.

Thus, an appropriate color image can be generated from the color mosaic image acquired from the image sensor which includes a color filter array which has arbitrary color transmission characteristics and array.

Additionally, according to the present image processing method, the color transmission characteristics and array are not limited as to the color filter array, and the color filter array can include color filters of four colors or more colors, and can have an array which has a periodicity larger than 2×2, or a random array. Also, by including a color filter array configured by color filters which differ markedly in transmittance, a color image can be generated which greatly surpasses the dynamic range regulated by the solid-state image sensor or A/D converting unit.

Also, in the image simulating step, color response conversion in which the characteristics of the color filter are simulated, and the convolution processing in which the characteristics of the optical LPF are simulated is performed. These are linear conversions, and can be expressed in a matrix operation.

Further, a convex set conversion which is equivalent to the output saturation of the image sensor, or a non-linear conversion which acts upon each element within the same basis space and does not reverse the magnitude correlation of the elements can be performed.

Corresponding to this, in the inverse projection step, inverse convolution processing is performed on the convolution wherein the color distribution and the optical LPF characteristics are simulated to correspond to the color response conversion wherein the characteristics of the color filter are simulated. These are linear conversions, and can be expressed in a matrix operation, and the matrix thereof is transposed with the matrix used in the image simulating step.

Further, in the comparison step, the difference or ratio of the estimated color mosaic image and the actual color mosaic image is generated, and in the case of a difference, the amount proportional to the output in the inverse projection step is added to the estimated color image in the feedback step, and in the case of a ratio, the amount proportional to the output of the inverse projection step is multiplied with the estimated color image in the feedback step.

Further, in the feedback step, the estimated color image is corrected based on the image obtained from the inverse projection step (color image space vector) and the minute amount of correction calculated in the image penalty calculation step, but this minute amount of correction is the value having a nature wherein the image penalty increases when added to the estimated color image. Further, this has a nature of becoming 0 as to the estimated color image wherein the image penalty takes an extreme value. Further, it is desirable for this minute amount of correction to be a gradient of the image penalty.

In order to easily calculate the minute amount of correction, it is desirable that the image penalty can be expressed as the sum of the image penalty calculable for each pixel, or have the image penalty depend only on the pixel value of the pixel and the neighboring pixels thereof as with a Markoff Random Field, or can be expressed using a color plane penalty which is calculable for each color plane. Considering the vision characteristics of humans, the color plane penalty is formed of the luminance plane and multiple chrominance planes, and is calculated with differing expression with the luminance plane and the chrominance plane.

For example, it can be said that "the penalty of a given color plane directly correlates to the size of the difference of the smoothed image thereof". In particular this is affected as to a luminance plane. An example of a smoothed image may be an image generated by providing convolution to the original image, or an image generated by applying a median filter, or an image obtained by a linear sum of these. Otherwise, a smoothed image can be created by applying various noise reduction filters which are proposed as monochrome images bilateral filters or the like. Also, the difference between the original image and the image in which convolution is added can be said to be a high frequency component of the original image.

Further, in order to suppress false colors, the color plane penalty is effective when the correlation of this color plane and the other color planes is reflected, and in a color plane such as RGB, it can be said that "the sum of each pixel of the value that inversely correlates to the product of the amount of change in a given color plane and the amount of change in a differing color plane". Further, as to a chrominance plane which may take the value of both positive and negative, such as YCbCr, because in the portions wherein the chrominance changes, the luminescence also has a tendency to change, and thus a penalty can be effective wherein "the sum of each pixel of the value that inversely correlates to the amount of change of the luminescence plane, and directly correlates to the amount of change in a chrominance plane".

According to such an image processing method, an appropriate color image can be generated as to the color mosaic image, and the generated color image has slightly suppressed the image penalty, and a natural image can be generated.

Further, without using a new penalty function, as to an unnatural image with much noise, it is known that the data size increases of the data generated in a natural image compression. Thus, the value directly correlating to the data size generated when the image is compressed can be made to be the image penalty.

An appropriate compression method in this case would be an entropy compression such as Golomb compression or the like, after basis conversion is performed.

While the present invention has been described with reference to exemplary embodiments, it is to be understood that the invention is not limited to the disclosed embodiments. On the contrary, the invention is intended to cover various modifications and equivalent arrays included within the spirit and scope of the appended claims. The scope of the following claims is to be accorded the broadest interpretation so as to encompass all such modifications and equivalent structures and functions.

This application claims priority from Japanese Patent Application No. 2004-175879 filed Jun. 14, 2004, which is hereby incorporated by reference herein.

What is claimed is:

1. An image processing device for generating an output image as a color image wherein each pixel has color information, using a first image as a sparsely color sampled image wherein each pixel has monochromatic information, which is obtained by an image sensor which has multiple pixels that photoelectrically convert light of a plurality of colors, the image processing device comprising:
a simulation unit configured to generate a second image as an estimated image of the sparsely color sampled image by simulating imaging using the image sensor based on the first image as the color image;
a comparison unit configured to compare the second image with the first image, and to generate first information which shows a comparison result;
a converting unit configured to convert the first information into second information which corresponds to the color image;
a penalty computing unit configured to compute a correction amount of the first image based on an image penalty which is determined corresponding to the first image; and a correction unit configured to generate a third image as the color image, by correcting the first image based on at least one of the second information and the correction amount;
wherein the third image which is generated by repeating the processing of the correction unit as the input image of the third image, becomes the output image.

2. The image processing device according to claim 1, wherein the simulation unit is configured to generate the second image as the estimated image of the sparsely color sampled image by simulating imaging wherein the image sensor is used, including non-linear conversion, based on the first image of the color image.

3. The image processing device according to claim 1, wherein the first image is acquired through a color filter, the simulation unit is configured to perform a color response conversion wherein the characteristics of the color filter are simulated, and the converting unit is configured to perform color distribution corresponding to the color response conversion.

4. The image processing device according to claim 1, wherein the first image is acquired through an optical low-pass filter, the simulation unit is configured to perform convolution wherein the characteristics of the optical low-pass filter are simulated, and the converting unit is configured to perform inversion convolution as to the results of the convolution.

5. The image processing device according to claim 1, wherein the comparison unit is configured to generate the first information illustrating a difference between the third image and the first image.

6. The image processing device according to claim 1, wherein the comparison unit is configured to generate the first information illustrating a ratio between the third image and the first image.

7. The image processing device according to claim 1, wherein the simulation unit is configured to perform linear conversion and nonlinear conversion which acts upon elements within a same basis space and does not reverse a magnitude correlation of the elements.

8. The image processing device according to claim 1, wherein the correcting amount is a value which decreases the image penalty by adding to the first image.

9. The image processing device according to claim 1, wherein the image penalty is expressed as a sum of pixel penalties capable of calculating by pixel.

10. The image processing device according to claim 1, wherein the image penalty is expressed using a color plane penalty capable of calculating by color plane.

11. The image processing device according to claim 10, wherein the color plane penalty reflects a correlation between the color plane and other color planes.

12. An imaging device comprising:
an image sensor; and
the image processing device according to claim 1.

13. The imaging device according to claim 12, wherein the image sensor is one of an image sensor wherein color filters of four or more colors are arranged, an image sensor wherein color filters of multiple colors are arranged in a cycle greater than 2×2, or an image sensor wherein the color filters of multiple colors are in an irregular arrangement.

14. An image processing device for generating an output image as a color image wherein each pixel has color information, using a first image as a sparsely color sampled image wherein each pixel has monochromatic information, which is obtained by an image sensor which has multiple pixels that photoelectrically convert light of a plurality of colors, the image processing device comprising:
- a simulation unit configured to generate a second image as an estimated image of the sparsely color sampled image, by simulating imaging using the image sensor including nonlinear conversion based on the first image as the color image;
- a comparison unit configured to compare the second image with the first image, and to generate first information which shows a comparison result;
- a converting unit configured to convert the first image into the second information which corresponds to the color image; and
- a correction unit configured to generate a third image as the color image, by correcting the input image based on the second information;
- wherein the third image which is generated by repeating the processing of the correction unit as the input image of the third image, becomes the output image.

15. The image processing device according to claim 14, wherein the nonlinear conversion is a nonlinear conversion which acts upon each element within a same basis space and does not reverse a magnitude correlation of the elements.

16. An imaging device comprising:
an image sensor; and
the image processing device according to claim 14.

17. An image processing method for generating an output image as a color image wherein each pixel has color information, using a first image as a sparsely color sampled image wherein each pixel has monochromatic information, which is obtained by an image sensor which has multiple pixels that photoelectrically convert light of a plurality of colors, the method comprising:
- a simulation step for generating a second image as an estimated image of the sparsely color sampled image by simulating imaging using the image sensor based on the first image as the color image;
- a comparison step for comparing the second image with the first image, and generating first information which shows a comparison result;
- a converting step for converting the first information into the second information which corresponds to the color image;
- a penalty computing step for computing a correction amount of the input image based on the image penalty which is determined corresponding to the input image; and
- a correction step for generating a third image as the color image, by correcting the input image based on at least one of the second information and the correcting amount;
- wherein the third image which is generated by repeating the processing of the correction step as the input image of the third image, becomes the output image.

18. An image processing program for causing a computer to execute the image processing method according to claim 17.

19. An image processing method for generating an output image as a color image wherein each pixel has color information, using a first image as a sparsely color sampled image wherein each pixel has monochromatic information, which is obtained by an image sensor which has multiple pixels that photoelectrically convert light of a plurality of colors, the method comprising:
- a simulation step for generating a second image as an estimated image of the sparsely color sampled image by simulating imaging using the image sensor including nonlinear conversion based on the first image as the color image;
- a comparison step for comparing the second image with the first image and generating first information which shows a comparison result;
- a converting step for converting the first information into the second information which corresponds to the color image; and
- a correction step for generating a third image as the color image by correcting the input image based on the second information;
- wherein the third image which is generated by repeating the processing of the correction step as the input image of the third image, becomes the output image.

20. An image processing program for causing a computer to execute the image processing method according to claim 19.

* * * * *